US010404777B2

(12) United States Patent
Saini et al.

(10) Patent No.: US 10,404,777 B2
(45) Date of Patent: Sep. 3, 2019

(54) IDENTIFYING SOURCES OF ANOMALIES IN MULTI-VARIABLE METRICS USING LINEARIZATION

(71) Applicant: Adobe Inc., San Jose, CA (US)

(72) Inventors: Shiv Kumar Saini, Rajasthan (IN); Ritwik Sinha, Kolkata (IN); Michael Rimer, Saratoga Springs, UT (US); Anandhavelu N, Tamil Nadu (IN)

(73) Assignee: Adobe Inc., San Jose, CA (US)

( * ) Notice: Subject to any disclaimer, the term of this patent is extended or adjusted under 35 U.S.C. 154(b) by 363 days.

(21) Appl. No.: 14/886,453

(22) Filed: Oct. 19, 2015

(65) Prior Publication Data
US 2017/0111432 A1   Apr. 20, 2017

(51) Int. Cl.
| | |
|---|---|
| *H04L 12/26* | (2006.01) |
| *H04L 29/08* | (2006.01) |
| *G06Q 30/02* | (2012.01) |
| *G06F 11/34* | (2006.01) |
| *H04L 12/24* | (2006.01) |

(52) U.S. Cl.
CPC ........ *H04L 67/025* (2013.01); *G06F 11/3409* (2013.01); *G06Q 30/0201* (2013.01); *H04L 67/22* (2013.01); *H04L 41/142* (2013.01); *H04L 43/08* (2013.01); *H04L 67/02* (2013.01)

(58) Field of Classification Search
CPC .... H04L 67/025; H04L 67/22; G06F 11/3409; G06Q 30/0201
See application file for complete search history.

(56) References Cited

U.S. PATENT DOCUMENTS

| | | | | |
|---|---|---|---|---|
| 9,176,728 | B1 * | 11/2015 | Dixit | G06F 8/71 |
| 9,465,778 | B1 * | 10/2016 | DeBo | G06Q 10/063 |
| 9,813,528 | B2 * | 11/2017 | Pal | H04L 69/329 |
| 2004/0190448 | A1 * | 9/2004 | Fishteyn | G06Q 30/0247 |
| | | | | 370/229 |
| 2008/0301175 | A1 * | 12/2008 | Applebaum | G06F 17/3051 |
| 2011/0119374 | A1 * | 5/2011 | Ruhl | G06F 17/3089 |
| | | | | 709/224 |
| 2014/0108640 | A1 | 4/2014 | Mathis | |

OTHER PUBLICATIONS

Tarem Ahmed and Mark Coates; "Multivariate Online Anomaly Detection Using Kernel Recursive Least Squares;" 2007; IEEE INFOCOM 2007; pp. 625-633.*

* cited by examiner

*Primary Examiner* — Mischita L Henson
*Assistant Examiner* — Christine Y Liao
(74) *Attorney, Agent, or Firm* — Keller Jolley Preece

(57) ABSTRACT

The present disclosure is directed toward systems and methods for identifying contributing factors associated with a multi-variable metric anomaly. One or more embodiments described herein identify one or more contributing factors that led to an anomaly in a multi-variable metric by calculating linearizing weights such that the total deviation in the multi-variable metric can be written as a weighted sum of deviations for dimension elements associated with the multi-variable metric.

20 Claims, 8 Drawing Sheets

IDENTIFYING SOURCES OF ANOMALIES IN MULTI-VARIABLE METRICS USING LINEARIZATION

BACKGROUND

1. Technical Field

One or more embodiments described herein relate generally to enhancing analytical performance. More specifically, one or more embodiments relate to identifying contributing factors associated with a metric anomaly.

2. Background and Relevant Art

Network users access millions of websites daily for a variety of purposes. Network users access websites for purposes such as commerce, information, and entertainment. In fact, it is not uncommon for network users to conduct a large portion of their daily tasks (e.g., shopping, news, recipes, exercise) via various websites. Additionally, users access networks to transfer files, submit search queries, upload pictures and other electronic media, send social network posts, or to utilize various "web-enabled" devices. Users utilize various network connections and servers to perform these tasks in addition to countless other tasks.

In light of widespread and daily network usage, administrators and marketers generally perform data analytics in association with actions performed by various network users in connection with one or more websites or client applications. Advancements in the ability to digitally track user interactions with websites provides administrators and marketers with insights into website usage and statistics not available in the pre-digital age. Occasionally, data analytics reveals anomalies associated with a particular type of user action performed in connection with a website, web page, or client application. For example, an anomaly can be an unexpected increase or decrease associated with a particular type of user action performed in connection with a website or application. To illustrate, a webpage may include an embedded video that, for the last month, web page visitors have played an average of 10 times a day. Then, one day, web page visitors may play the embedded video 50 times. This increase in the number of times web page visitors play the embedded video is generally considered an anomaly because it is an outlier compared to the expected number of plays.

While administrators and marketers can generally identify an anomaly with ease, determining why the anomaly occurred is typically a complex and time consuming task even with the advanced data that digital analytics provides. For example, in response to identifying an anomaly associated with a decrease in the number of website visitors who land on a particular web page within the website, a website administrator generally has to run dozens or even hundreds of reports and queries in order to identify the factors that contributed to the decrease. It may take days, if not weeks, for the website administrator to run and review the results of these reports and queries in order to determine that, for example, the decrease in the number of website visitors who land on the particular webpage was due to factors including a loss of website traffic from a particular search engine (e.g., perhaps due to a change in the website's search engine optimization related to that search engine), and a loss of web traffic from a particular geographic region (e.g., perhaps due to a change in a marketing campaign focused on that particular geographic region). The amount of data and the complexity of data that digital analytics provides often can obscure the sources of the anomalies.

The foregoing issues associated with identifying contributing factors to anomalies are often exacerbated when dealing with multi-variable metrics. For example, when identifying contributing factors associated with multi-variable metrics such as page views per visitor, average time spent on a page, etc., the metric with the largest deviation is often not the largest contributing factor related to the anomaly in the multi-variable metric.

Thus, there are several disadvantages to current methods for identifying factors leading to anomalies, particularly when dealing with multi-variable metrics.

SUMMARY

One or more embodiments described herein provide benefits and/or solve one or more of the foregoing or other problems in the art with systems and methods that allow for the identification of contributing factors to analytic anomalies. More particularly, one or more embodiments involve identifying multi-variable metrics that contribute to analytic anomalies. For example, one or more embodiments involve identifying weighted deviations between actual and expected values for dimension elements related to a multi-variable metric associated with an anomaly. The systems and methods then use the weighted deviations to identify multi-variable metrics that contributed to the anomaly.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

Various embodiments will be described and explained with additional specificity and detail through the use of the accompanying drawings in which.

DETAILED DESCRIPTION

Figure 1A:
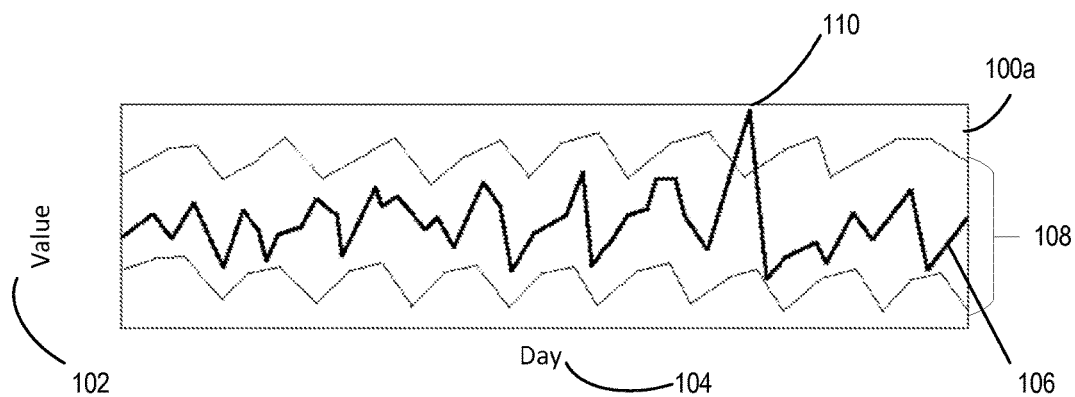
FIGS. 1A-1C illustrate graphs representing example datasets in accordance with one or more embodiments.

One or more embodiments described herein include an analytics system that identifies anomalies related to metrics associated with a network application (e.g., website, native application, etc.). In one or more embodiments, an analytics system described herein identifies anomalies by comparing current data related to a particular metric against a set of training data that predicts the performance of that particular metric to identify anomalies. More particularly, one or more embodiments involve identifying multi-variable metrics that contribute to analytic anomalies. For example, the analytics system identifies weighted deviations between actual and expected values for dimension elements related to a multi-variable metric associated with an anomaly. The analytics system then uses the weighted deviations to linearize the multi-variable metrics. Once the multi-variable metrics are linearized, the analytics system identifies the multi-variable metrics that contributed to the anomaly.

As used herein, the term "anomaly" refers to a statistically significant change within trend data associated with a particular aspect of a network application. For example, a website may experience an anomaly when web traffic to a particular page within the website suddenly increases beyond average or expected numbers. Other anomalies can include, but are not limited to, changes in how often a link is clicked, how often a video is viewed, how often a product is purchased, etc. As another example, an anomaly in a web metric can include an unexpected decrease in page views of a web page, or an unexpected increase in revenue generated by the website. In addition, an "anomaly period" is representative of a time duration in which the anomaly is observed, such as a one or more hours, days, weeks, and so on.

The analytics system can identify significant changes in "single variable metrics" such as page views, orders, etc. that lead to the identified anomalies. The analytics system can also identify significant changes in "multi-variable metrics" such as page views per visitor, average time spent on a page, etc. that lead to the identified anomalies. As used herein, the term "metric" refers to user actions or other measurable attributes that may occur within a network environment, such as a web page or native application. Some examples of metrics include, but are not limited to, web page lands, video completes, link clicks, revenue generated by the website, number of units sold, number of prior visits by visitors, number of clicks by visitors, number of logins, length of visits, etc. Metrics generally are user or other actions that lead to anomalies. For example, by measuring a link click metric associated with a link on a particular web page, the analytics system can identify an anomalous increase in the number of times the link is clicked in a 24-hour period.

As used herein, the term "single variable metric" refers to a type of metric that is simply represented by a single type of data. For example, a single variable metric associated with a website may be page views, total revenue, nationality of a visitor, etc. An anomaly in a single variable metric can generally be expressed as the difference between the actual performance of the single variable metric and the expected performance of the single variable metric.

As used herein, the term "multi-variable metric" refers to a more complex type of metric that is a function of two or more single variable metrics. Multi-variable metrics of interest to data analysts often include orders per visit, page views per visit, and revenue per order. As mentioned above, in one or more embodiments, an anomaly in a multi-variable metric is not expressed as the difference between actual performance and expected performance. Rather, as will be described in further detail below, the analytics system can calculate and rank weighted deviations associated with elements related to the multi-variable metric in order to identify factors that led to the anomaly in the multi-variable metric.

Furthermore, the analytics system also identifies one or more contributing factors that led to an identified anomaly related to a particular metric. For example, if the particular metric is page views per visit on a website and the identified anomaly is a sudden decrease in page views per visit on the website, the analytics system can identify one or more contributing factors that led to the sudden decrease in page views per visit. As used herein, the term "contributing factor" refers to a dimension element associated with a particular metric that leads to an identified anomaly. For example, if a particular web page within a website experiences an anomalous increase in web traffic over a 24-hour period, contributing factors to the anomalous increase in web traffic may include a new advertisement campaign recently launched by the website, a new search engine optimization technique utilized by the website, etc. Any identified anomaly may have numerous contributing factors, and each contributing factor may have a different level or percentage of contribution to the identified anomaly.

As mentioned above, a total deviation for a single variable metric becomes an anomaly when the total deviation is statistically significant. Also as mentioned above, the total deviation for a single variable metric can be identified as the difference between the actual total value of the single variable metric (e.g., 5 page views) and the expected total value of the single variable metric (e.g., 10 page views). However, this simple calculation does not give a true result when applied to multi-variable metrics. Accordingly, in one or more embodiments, the analytics system identifies one or more contributing factors that led to an anomaly in a multi-variable metric by first finding linearizing weights such that the total deviation in the multi-variable metric can be written as a weighted sum of deviations for dimension elements associated with the multi-variable metric.

As used herein, the term "dimension" refers to a categorical variable associated with a metric. A dimension can include, but is not limited to, a country of a visitor to the website, a browser type used by the visitor to access the website, a referring website that directs visitors to the website, and so forth. For example, if the anomalous metric is "page views," dimensions associated with page views may be referring search engines, referring search terms, bounce rate, age and gender of visitors, geographical information associated with visitors, etc. Thus, a dimension can represent any of a variety of categorical variable associated with the website.

As used herein, the term "dimension element" refers to a particular occurrence that directly contributes to a dimension or a further partitioning of a dimension. For example, a dimension element can be a value associated with a corresponding dimension. To illustrate, if a dimension is "countries," corresponding dimension elements can include "USA," "Canada," "Mexico," and so forth.

Once the analytics system identifies one or more weighted deviations for the dimension elements associated with the multi-variable metric, the analytics system can utilize a statistical approach to rank the dimension elements based on their weighted deviations. In one or more embodiments, the analytics system ranks the dimension elements based on their weighted deviations such that the highest ranked dimension element is the top contributing factor that led to the anomaly in the multi-variable metric. Thus, the analytics system can identify contributing factors that lead to anomalies in multi-variable metrics, which often provide a richer and deeper source of information for data analysts than more traditional single variable metrics.

More particularly, one or more embodiments linearize a multi-variable metric and then use an approach similar to those used for single variable metrics to identify the sources of the multi-variable metric anomaly. As an example, let xt be the value of a multi-variable metric on day t. Let xijt be the value on day t for dimension i and dimension-element j. The goal is to find the dimension elements that led to difference between actual (xt) and expected (et) value of the metric on day t. For a single variable metric this can be achieved by finding the dimension-elements along which the metric differed the most. For a multi-variable metric, such as order per visit, finding the dimension-element with the largest difference between actual and expected is not sufficient. The main issue for a multi-variable metric is: $xt \neq \Sigma j\, xijt$. For example, the sum of orders per visits by countries is not equal to orders per visit. One or more embodiments overcome the problem by linearizing the multi-variable metric along the dimension-elements. The following approach is used to find the dimension elements that led to difference between actual and expected:

1. Linearize the multi-variable metric, xt, by using weights $wij = \partial xt/\partial xijt$ and $weij = \partial et/\partial eijt$ $xt = \Sigma j\, wij*xijt$ and $et = \Sigma j\, weij*eijt$.
2. Use wij*xijt as the total impact of the metric along ith dimension jth dimension-element on the total value of the metric xt.
3. Use an approach valid for single variable metrics to rank the dimension-elements in terms of highest contribution to the deviation: xt−et.

Querying Analytics Data

As mentioned above, the analytics system described herein identifies anomalies in data associated with a network application. As used herein, the term "network application" refers to computer software that causes one or more computing devices to perform useful tasks and that is supported by or uses a network (e.g., the Internet) to preform a portion of the useful tasks. Examples of network applications include websites, desktop computing applications (e.g., native applications for personal computers or laptops), and mobile applications (e.g., native applications for phones and tablets). The process by which the analytics system identifies one or more anomalies in data associated with a network application begins when the analytics system queries and receives data from an analytics database. In one or more embodiments, the analytics database contains current and historical data associated with the network application, trend data associated with the network application, and so forth. For example, in response to a data query from the analytics system, the analytics database can return a random sample of data items that are representative of a whole data set. In that case, the analytics system can perform one or more analyses on the random data set to identify metric anomalies. Furthermore, in at least one embodiment, the analytics system can identify a complete data set that corresponds to a random sample of data items.

More particularly, in one or more embodiments the analytics database includes a plurality of distributed servers. In one or more embodiments, upon receiving a request for a contribution analysis report, the analytics system can query a small sampling of the servers. The analytics system can then process the data returned from the small sampling of servers to identify factors related to an anomaly. Once the set of potential factors are identified, the analytics system can query a large amount or all of the servers in the plurality of distributed servers for the data related to the set of potential factors. In this manner the analytics system can quickly identify factors contributing to an anomaly (i.e., in a manner of seconds or minutes rather than days or weeks).

In one or more embodiments, the analytics system performs tens of millions of queries against the data set in order to identify one or more anomalies and their respective contributing factors. Then, the analytics system applies machine learning to identify which factors statistically contribute to the anomaly. More particularly, the analytics system can query eVars, props (including pathing—e.g., enter/exit), out-of-the box variables, SAINT classifications, customer attributes, social data, video data, mobile data, target based survey data, any data that exists. The analytics system then applies the machine learning statistical test to identify across the data if is there a subset that helps explain the anomaly.

Furthermore, the analytics system can maintain and utilize various data reports. In one or more embodiments, the analytics system queries data from the analytics database in accordance with various data reports. For example, each data report can include queries that instruct the analytics database on data items that should be returned. In at least one embodiment, the analytics system can maintain and utilize hundreds, thousands, or even millions of data reports in connection with the analytics database. The analytics database may store the data reports, and the analytics system may simply instruct the analytics database on which reports to run. As mentioned above, the analytics system can run the maintained data reports against a random sampling of data related to a particular query rather than running the maintained data reports against all data related to the particular query in order to save time and processing power. The analytics system can first run the maintained data reports against a random sampling of data related to a particular query in order to identify the most relevant data before running the maintained data reports again against the identified relevant data.

The analytics system can also organize and store the results of one or more data reports. For example, as described above, the analytics system and/or the analytics database can process one or more data reports, which in turn return some number of data results. Accordingly, in one or more embodiments, the analytics system can receive and organize the returned data results. In at least one embodiment, the analytics system can organize returned data results chronologically, topically, or based on any other characteristic suitable for organizing data.

Identifying Anomalies

Once the analytics system has queried relevant data from the analytics database, the analytics system identifies one or more anomalies in metrics related to the relevant data. As mentioned above, metrics associated with a website occasionally experience unexpected increases and/or decreases. To illustrate, users may play a particular video on a web page an average of 10 times a day, only to one day play the video 100 times. This unexpected increase in the "video completes" metric on that web page may or may not be an anomaly, depending on whether the increase is statistically significant. In one or more embodiments, the analytics system can not only identify increases and decreases in a wide range of metrics, the analytics system can also determine if a particular increase or decrease in a metric is statistically significant, thus making the increase or decrease in a particular metric an anomaly for that metric.

The analytics system can identify increases and decreases in a particular metric by first querying training data (i.e., past values for the metric). For example, in order to determine whether the current metric has increased or decreased, the analytics system can query training data related to the metric for a certain time period. In some embodiments, the training data time period can be the past 30, 60, or 90 days. The training data time period can be configurable or user selectable.

In response to an established training data time period, the analytics system can analyze data associated with the metric for the training data time period. For example, if the particular metric is "video completes" and the training data time period is 30 days, the analytics system can process existing data associated with video completes for last 30 days. At this point, the analytics system can perform a comparison to determine whether the current video completes metric has increased or decreased over the average frequency associated with the metric in question within the training data.

Next, in order to determine whether the current increase or decrease associated with a metric is statistically significant, and thus an anomaly, the analytics system can run a predictive analysis on the training data. In one or more embodiments, the predictive analysis can involve determining an expected range associated with a metric. For example, on an average day, a web page may experience 10 video completes, but the expected range associated with the video completes metric can be plus or minus a certain amount. Thus, the analytics system may determine that an increase or decrease in video completes by 1 or 2 video completes would not be statistically significant. In some embodiments, the analytics system may determine that the expected range associated with a metric is within approximately 95% of the observed metric value.

Furthermore, the analytics system can run a predictive analysis on the training data to determine an expected metric value. In one or more embodiments, the predictive analysis can determine an expected metric value by recognizing data trends associated with the metric and using machine learning to project those trends. For example, if a web page has experienced 9-11 video completes per day for the last 14 days, the predictive analysis may determine that the web page will likely continue to experience approximately 10 video completes on day 15.

The analytics system can also determine whether an increased or decreased metric value is statistically significant, thus making the metric value anomalous. In one or more embodiments, the analytics system can determine whether a metric value is statistically significant based on whether the metric value is outside the expected range for that particular and/or based on whether the metric value is in line with the expected metric value within the data trend, as described above. The analytics system can further determine whether a metric value is anomalous based on other statistical analysis and/or machine learning. Anomaly detection is further described in U.S. patent application Ser. No. 13/651,176, filed Oct. 12, 2012, which is incorporated by reference herein in its entirety.

Figure 1B:
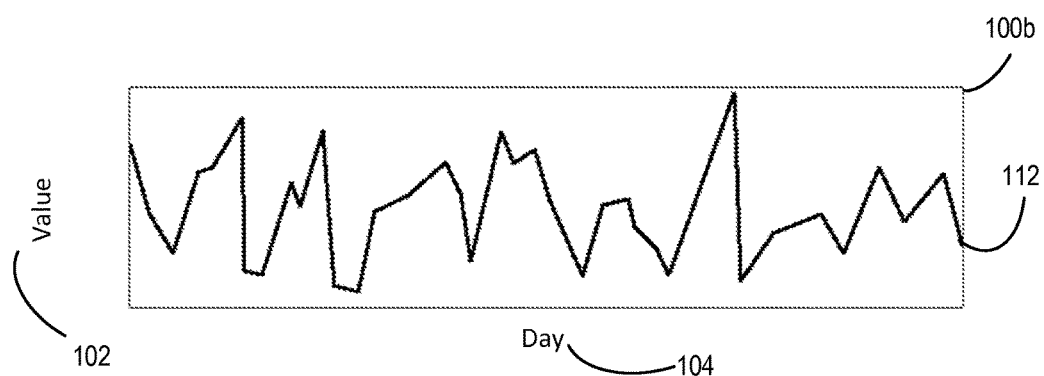
Figure 1C:
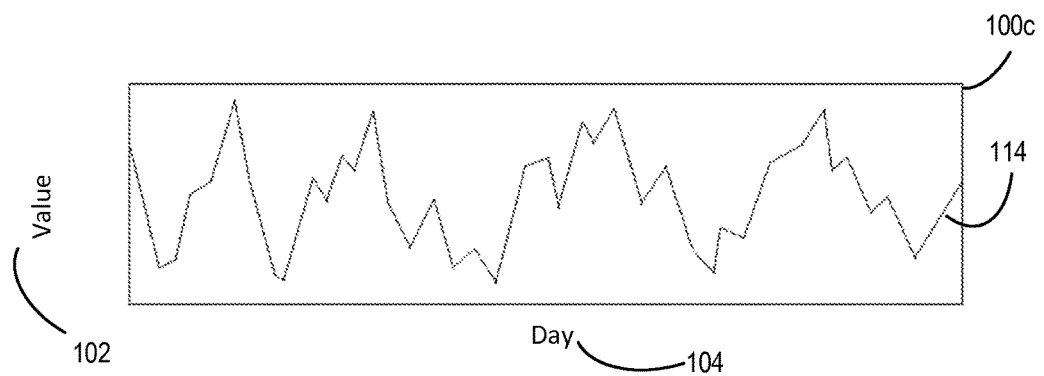

FIGS. 1A-1C illustrate outputs of example data sets associated with an orders per visit multi-variable metric. As shown in FIG. 1A, the chart 100a charts orders per visit along the y-axis (e.g., as indicated by the y-axis title 102, "Value") over time (e.g., as indicated by the x-axis title 104, "Day"). Using the methods described above, the analytics system can chart the actual orders per visit associated with a particular website, as shown by the line 106. Additionally, using the methods described above, the analytics system can identify a range 108 that indicates how the orders per visit metric is expected to perform. Accordingly, the analytics system can identify an anomaly 110 where the actual orders per visit fall outside the expected range 108. While the anomaly 110 illustrates more orders per visit than expected, in alternative embodiments, the anomaly can comprise less orders per visit than expected.

FIGS. 1B and 1C illustrate the data sets that make up the orders per visit metric ratio (e.g., where "orders" is the numerator and "visit" is the denominator). For example, FIG. 1B illustrates a chart 100b of orders over time (e.g., as shown by line 112). Similarly, FIG. 1C illustrates a chart 100c of visits over time (e.g., as shown by line 114). Accordingly, using the methods described above, the analytics system can combine these data sets as a ratio to form the dataset representative of the orders per visit multi-variable metric.

Example for Identifying Contributing Factors—Contribution Analysis

Once data is queried and an anomaly is found, the natural next step is to identify the source of the anomaly.

As mentioned above, a problem when attempting to identify contributing factors to an anomaly in a multi-variable metric is that the total deviation in a multi-variable metric (e.g., the difference between actual performance and expected performance) cannot be written as a linear function of deviations of dimension elements. To illustrate this point, the example of identifying the largest contributor to an anomaly in page views per visitor is provided. A metric, such as orders per visit, can be broken down into dimension elements along hundreds of dimensions. For example, orders per visit can be broken down by country of visitor, the browser used for accessing the website, or visit origination, etc.

As mentioned above, for a single variable metric, identifying contributing factors relies upon identifying dimension elements that deviate significantly from expected values. However, for a multi-variable metric, the dimension-element with the largest deviation from expected might not be the largest contributor. An example is provided below to illustrate this point.

TABLE 1

|  | USA | Canada | Other | Total |
|---|---|---|---|---|
| Expected Page Views per Visitor | 9.5 | 20 | 9 | 10 |
| Actual Page Views per Visitor | 4.5 | 6 | 10 | 4.85 |
| Percent of Total Visitors | 90% | 5% | 5% | 100% |

As described above, the largest deviation between actual and expected page views per visitor is for Canada (a difference of 14 page views per visitor). However, only 5% of the total number of visitors are from Canada. Thus, the large deviation identified for Canada is unlikely to be a statistically significant contributing factor that led to a change in the total page views per visitor metric. Rather, a factor associated with the USA is likely the largest contributing factor to the metric in question, even though the deviation identified for USA is smaller than the deviation identified for Canada. As explained below, in the above example, USA (actual—expected) will have a bigger effect than that of Canada's on the total (actual—expected).

In this example, the analytics system can use the percent of the total number of visitors for each country as a linearizing weight for each country dimension element deviation in order to identify the total deviation for the page views per visitor metric. As used herein, the term "linearizing weight"

refers to a weight calculated for a dimension element such that a total deviation for a multi-variable metric can be written as a weighted sum of individual dimension element deviations. The following equation illustrates how the linearizing weights $W_{USA}$, $W_{CANADA}$, and $W_{OTHER}$ allow the deviations various page views per visitor from the various countries can be summed to find the total deviation of page views per visitor:

$$x_t - e_t = w_{USA}*(x_{USA,t} - e_{USA,t}) + w_{Canada}*(x_{Canada,t} - e_{Canada,t}) + w_{Other}*(x_{Other,t} - e_{Other,t})$$

In this equation, the actual total performance of the page views per visitor metric for a period of time (i.e., "$x_t$") minus the expected total performance of the page views per visitor metric for the same period of time (i.e., "$e_t$") equals the sum of weighted deviations for each of the dimension elements associated with the page views per visitor metric. As used herein, the term "weighted deviation" refers to the product of the difference between actual performance and expected performance for a particular dimension element and a linearizing weight. For example, "$w_{USA}*(x_{USA,t} - e_{USA,t})$" is the weighted deviation for the "USA" dimension element for the period of time and "$w_{Canada}*(x_{Canada,t} - e_{Canada,t})$" is the weighted deviation for the "Canada" dimension element for the period of time, etc. Below it is shown that if the percent visitors for each country is used as the linearizing weights, the given equation holds true: $4.85 - 10 = 0.9*(4.5 - 9.5) + 0.05*(6-20) + 0.05*(10-9) = -5.15$.

This allows the analytics system to rank the contributing dimension elements in terms of importance. The contribution from USA to the total deviation for the page views per visitor metric is $0.9*(4.5-9.5) = -4.5$, while the contribution from Canada equals $-0.7$, and the contribution from other equals $0.05$. Thus, the analytics system identifies the highest change comes from USA (e.g., the most significant contributing factor), followed by Canada.

In this example, the percentage of visitors coming from each country (e.g., the linearizing weight) is the same for each country's actual performance and expected performance. In alternative embodiments, the dimension element actual performance linearizing weight can be different from the dimension element expected performance linearizing weight, as shown in the following equation:

$$x_t - e_t = w_{USA}*x_{USA,t} - w_{USA}^e*e_{USA,t} + w_{Canada}*x_{Canada,t} - w_{Canada}^e*e_{Canada,t} + w_{Other}*x_{Other,t} - w_{Other}^e*e_{Other,t} \quad \text{(Equation 1)}$$

Solution for a General Function

The preceding example illustrates an approach for an "average" multi-variable metric (e.g., a ratio of two single variable metrics). In additional embodiments, the analytics system identifies contributing factors for a general function of multi-variable metrics. For example, the analytics system can linearize a general function of multi-variable metrics to identify one or more significant contributing factors. In at least one embodiment, the analytics system can utilize a mathematical derivation that shows that the linearizing weights used in the example above in represent an increase in the total metric due to an increase in the metric value for a dimension element associated with the metric. This rate multiplied by the value of the metric for a dimension element gives the contribution of the dimension element.

To illustrate, the analytics system can utilize the above motivation to rank the dimension elements in terms of their contribution to the total deviation for a given metric. Let $u_t$ and $v_t$ be two single variable metrics such that for a dimension i:

$$u_t = \Sigma_j u_{ijt} \text{ and } v_t = \Sigma_j v_{ijt}$$

The total calculated metric for the time period t and the calculated metric for the dimension i and the dimension element j are:

$$x_t = f(u_t, v_t) \text{ and } x_{ijt} = f(u_{ijt}, v_{ijt})$$

where $f(.,.)$ is a differentiable function. In one or more embodiments, the total differentiation of $x_t$ can be written as:

$$dx_t = \Sigma_j (\partial x_t / \partial x_{ijt}) * dx_{ijt} \quad \text{(Equation 2)}$$

Here, the term on the left hand side of the equality, $dx_t$, is the change in the metric. On the right hand side of the equality, the first term in the sum is the derivative of the total metric with respect to the metric from the $i^{th}$ dimension to the $j^{th}$ dimension element. The analytics system uses the partial derivative (e.g., as indicated by "$\partial$") because $u_{ikt}$, $v_{ikt}$ for $k \neq j$ are kept constant in the derivative. In other words, the partial derivative represents change in the total metric if the metric value for a dimension element is changed, keeping everything else constant.

Using Equation 2, the difference between actual total performance and expected total performance for a metric during a time period can be approximated as follows:

$$x_t - e_t \approx \Sigma_j \{(\partial x_t / \partial x_{ijt}) * x_{ijt} - (\partial e_t / \partial e_{ijt}) * e_{ijt}\} \quad \text{(Equation 3)}$$

Comparing Equation 1 and Equation 2, the weights in Equation 1 are: $w_{ij} = \partial x_t / \partial x_{ijt}$ and $w_{ij}^e = \partial e_t / \partial e_{ijt}$. Thus, for a general function of single variable metrics, the analytics system can calculate the partial derivative in Equation 1, which can be done numerically as long as the exact functional form is known.

Returning to an average metric, such as laid out above in the page views per visitor example with reference to Table 1, the analytics system can derive Equation 3. For example, in the case of an average metric:

$$x_t = f(u_t, v_t) = u_t / v_t \text{ and } x_{ijt} = f(u_{ijt}, v_{ijt}) = u_{ijt} / v_{ijt}$$

The analytics system can calculate the partial derivative in Equation 3, as given by[1]:

$$\partial x_t / \partial x_{ijt} = v_{ijt} / v_t, \partial e_t / \partial e_{ijt} = v_{ijt}^e / v_t^e$$

Thus, the above partial derivative is a fraction of the denominator metric for the $i^{th}$ dimension to the $j^{th}$ dimension element. These are the linearizing weights used in Equation 1, above.

[1] Proof: $\partial x_t / \partial x_{ijt} = [du_t / v_t (1 - (dv_t / v_t)/(dv_t / u_t))] / [du_{ijt} / v_{ijt} (1 - (dv_{ijt} / v_{ijt})/(dv_{ijt} / u_{ijt}))]$. Since $(dv_t / v_t)/(dv_t / u_t) = (dv_{ijt} / v_{ijt})/(dv_{ijt} / v_{ijt})/(dv_{ijt} / u_{ijt}) = 1$, and $du_t = du_{ijt}$, the result follows.

Ranking Dimension Elements Based on their Contribution

As mentioned above, once the analytics system has identified weighted deviations for one or more dimension elements associated with a multi-variable metric, the analytics system can utilize a statistical approach to rank the dimension elements based on their weighted deviations. Although the example described above includes dimension elements (e.g., "USA," "Canada," "other") from only one dimension (e.g., "Countries") associated with the multi-variable metric page views per visitor, additional or alternative embodiments include multiple dimensions and dimension elements associated with a multi-variable metric. In that case, the resulting weighted deviations for the dimension elements from the various dimensions may or may not be directly comparable.

In order to compare weighted deviations for dimension elements across dimensions, the analytics system can convert the weighted deviations into proportions. In one or more embodiments, the analytics system can perform this conversion by utilizing "Pearson's Residual," which converts the values of the weighted deviations into proportions associated with the anomaly behavior of the multi-variable metric. The analytics system can use the resulting proportions to assign scores to the dimension elements to determine an amount of contribution to the anomaly behavior by each dimension element. Under this approach, the analytics system can identify the top-scored dimension elements as the most significant contributing factors to the multi-variable metric. The statistical approach to ranking dimension elements is further described in U.S. patent application Ser. No. 14/526,149, filed Oct. 28, 2014, which is incorporated by reference herein in its entirety.

Results

Figure 2A:
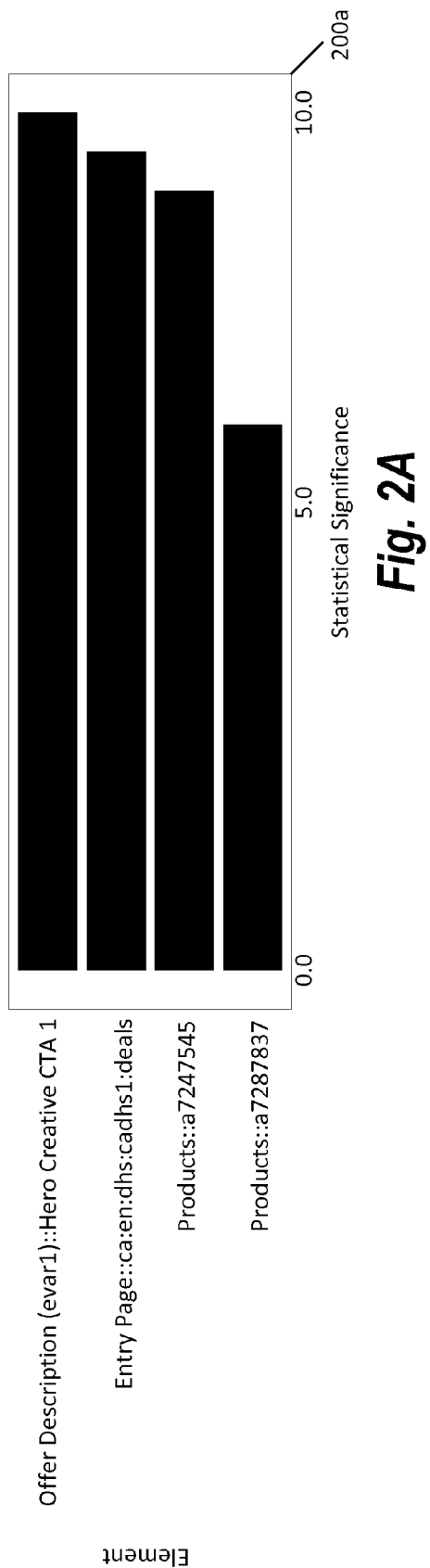
FIGS. 2A-2B illustrate results graphs in accordance with one or more embodiments.
Figure 2B:
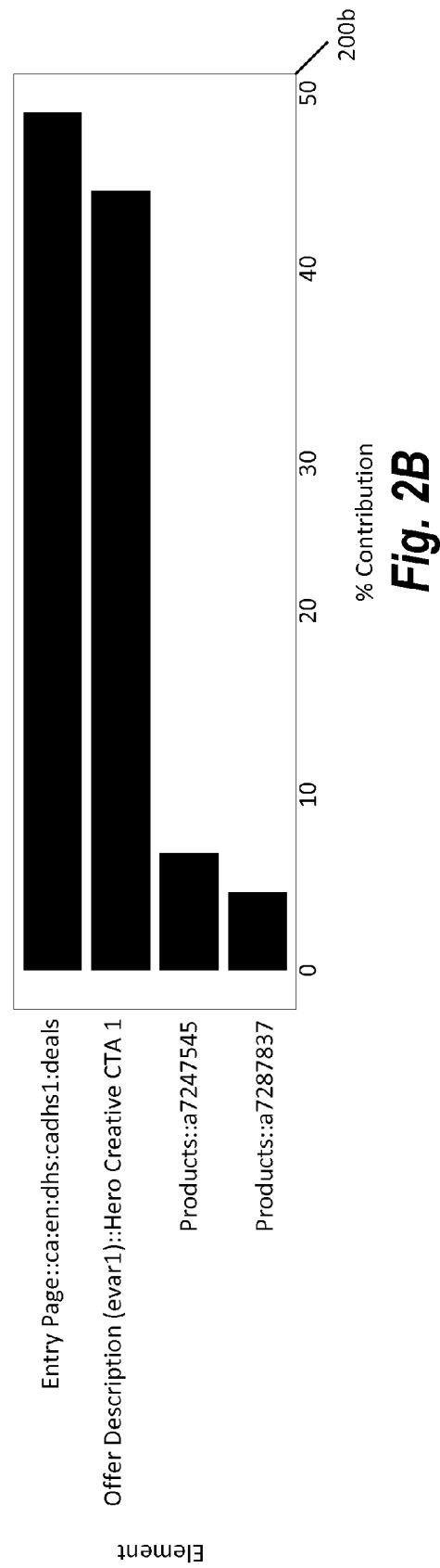

As described above, the analytics system can identify and rank dimension elements that contribute significantly to an anomaly in a multi-variable metric. FIGS. 2A and 2B illustrate example output rankings of various dimension elements that contributed to an anomaly in an orders per visit metric. For example, as shown in FIG. 2A, chart 200a ranks dimension elements by their statistical significance (e.g., as ranked by the analytics system using Pearson's Residual, described above). As shown, a dimension element called "Offer Description (evar1)::Hero Creative CTA 1" is mostly highly ranked (e.g., ranked 10.0) among the other dimension elements. Thus, a data analyst would be able to see at a glance that an anomalous change in orders per visit for a particular website was largely due to the "Hero Creative CTA 1" offer. The remaining ranked dimension elements provide an insight into which products sold best during the time when this offer was active.

FIG. 2B illustrates the percent contribution that is attributable to various dimension elements associated with the orders per visit multi-variable metric. As shown in the chart 200b, almost 45% of the anomalous change in the orders per visit metric is attributable to the "Hero Creative CTA 1" offer. Also illustrated is what percentage of the anomalous change is attributable to various products that sold well during the time period that the offer was active.

Thus, one or more embodiments determines seemingly hidden patterns within data to explain statistical anomalies and identify correlations behind unexpected customer actions, out-of-bounds values, and sudden spikes or dips for selected metrics. For example, the analytics system identifies contributing factors associated with a particular anomaly that may not seem related to the anomaly in a meaningful way (e.g., a change to an advertisement campaign related to a website in one geographic area may affect website traffic from users in a different geographic area). Furthermore, one or more embodiments allows for immediate and prompt data analysis to discover why an anomaly happened. More particularly, one or more embodiments can perform complex statistical analysis on a sample set of data (e.g., data from a limited portion of database or distributed storage). Based on the statistical analysis on the sample set of data, the analytics system can identify potential factors that contributed to the anomaly. Once the potential factors are identified, the analytics system can query the entire data set for information about the potential factors. Thus, the analytics system can break down contributions to an anomaly in seconds or minutes compared to weeks.

The analytics system can help develop a narrative for customer interactions. Furthermore, the analytics system can strategically identify and capture meaningful associations to develop new audience segments or tactically identify out-of-bound or fraudulent activity that triggers an alert. Furthermore, the analytics system can provide interactive visualizations designed to give varying perspectives to help answer why anomaly happened and what to do about the anomaly.

Example Environment

Figure 3:
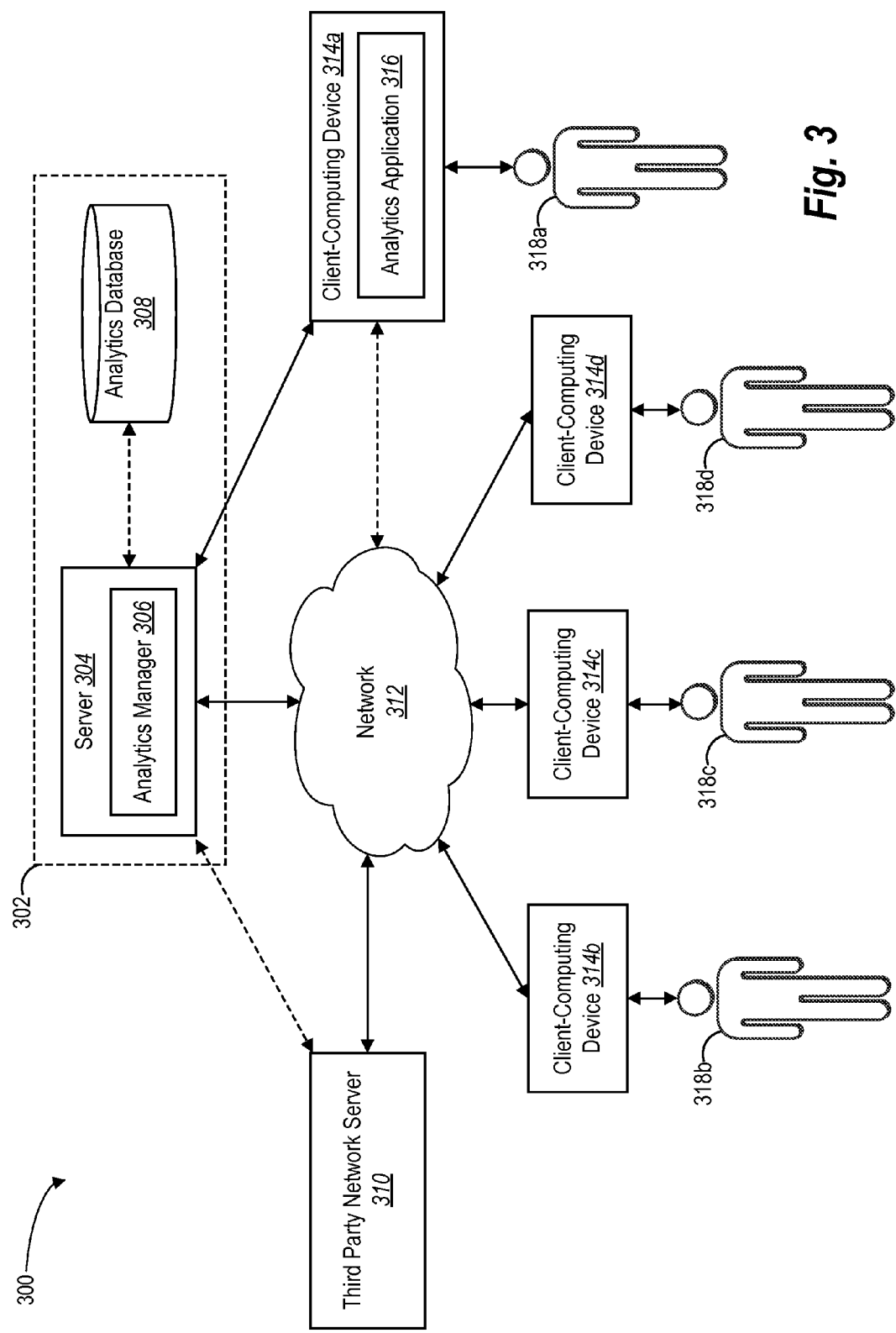
FIG. 3 illustrates a block diagram of an environment for implementing an analytics system in accordance with one or more embodiments.
Figure 4:
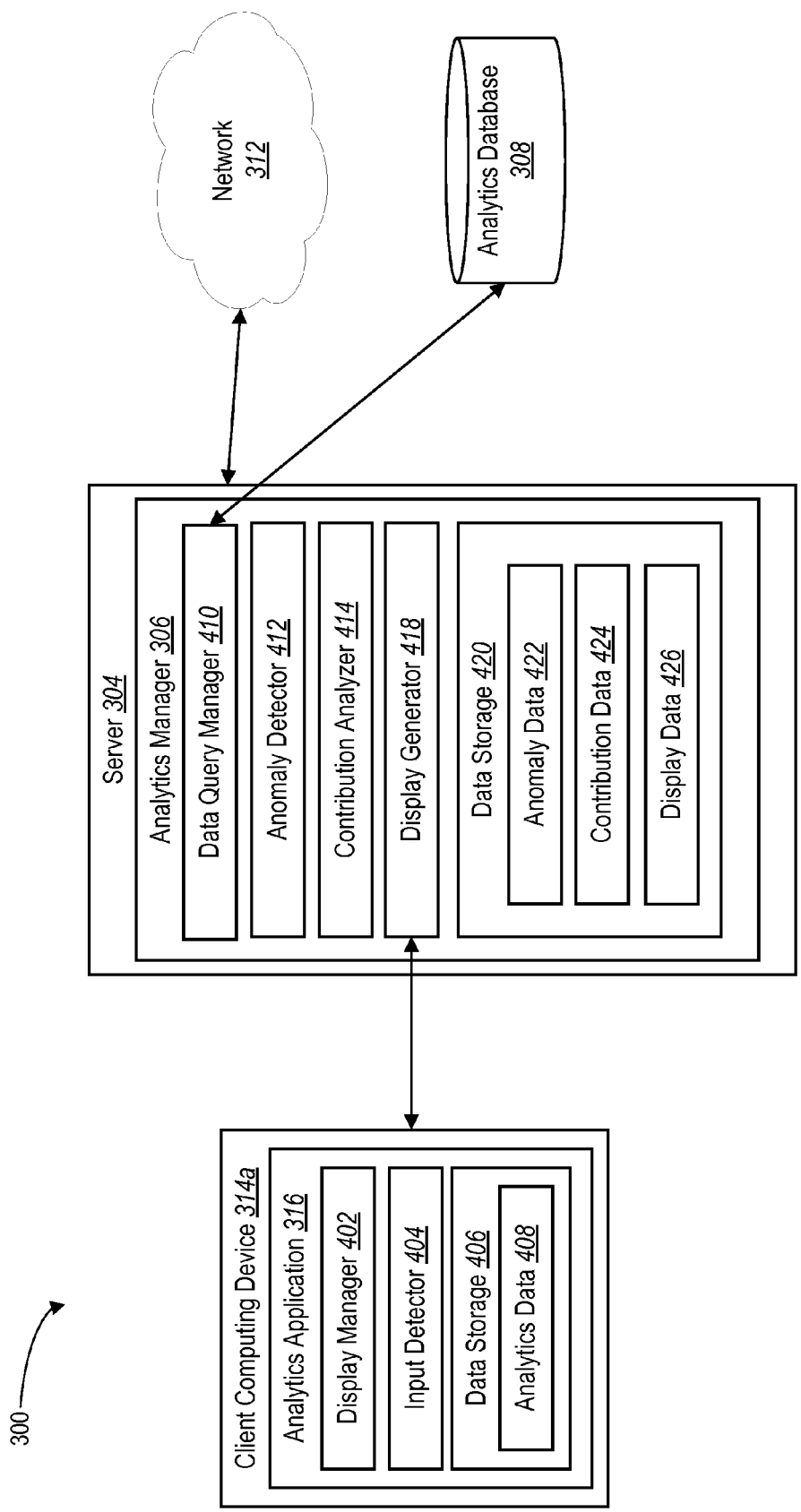
FIG. 4 illustrates a schematic diagram of the analytics system of FIG. 3 in accordance with one or more embodiments.

FIGS. 3 and 4 provide an overview of an analytics system environment and example architecture to provide context for the analytics system described above. FIG. 3 is a schematic diagram illustrating an analytics system 300 in accordance with one or more embodiments. As illustrated in FIG. 3, the analytics system 300 may include users 318a, 318b, 318c, and 318d, client-computing devices 314a, 314b, 314c, and 314d, a third-party network server 310 (e.g., a web server), and a network 312 (e.g., the Internet). As further illustrated in FIG. 3, the client-computing devices 314b-314d can communicate with the third-party network server 310 and the server 304 through the network 312. Although FIG. 3 illustrates a particular arrangement of the users 318a-318d, the client devices 314a-d, the network 312, the third-party network server 310, and the analysis system 300, various additional arrangements are possible. For example, the client devices 314b-314d may directly communicate with the third-party network server 310, bypassing the network 312.

While FIG. 3 illustrates four users 318a-d, the analytics system 300 can include more than four users. For example, the server 304 and the analytics manager 306 thereon may manage and query data representative of some or all of the users 318a-318d. Additionally, the analytics manager 306 may manage and query data representative of other users associated with the third-party network server 310. Furthermore, in one or more embodiments, the users 318b-318d can interact with the client-computing devices 314b-314d, respectively. Examples of client devices may include, but are not limited to, mobile devices (e.g., smartphones, tablets), laptops, desktops, or any other type of computing device. See FIG. 7 for additional information regarding client-computing devices.

Additionally, in one or more embodiments, the client-computing devices 314b-314d of the analytics system 300 can communicate with the third-party network server 310 through the network 312. In one or more embodiments, the network 312 may include the Internet or World Wide Web. The network 312, however, can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. The network 312 is further described with reference to FIG. 8 below.

In one or more embodiments, the client-computing devices 318b-318d may communicate with the third-party network server 310 for a variety of purposes. For example, the third-party network server 310 may be a web server, a file server, a server, a program server, etc. Thus, in one or more embodiments, the client-computing devices 314b-314d communicate with the third-party network server 310 for purposes such as, but not limited to, requesting a web page, uploading a file, updating a profile, downloading a game, and so forth. For example, in one embodiment the third-party network server 310 may be a web server for an ecommerce business. In that example, a user 318b may communicate with the web server by requesting web pages from the web server for display via a web browser operating on the client-computing device 314b-314d.

In one embodiment, the analytics system 300 can track and store various user data related to interactions between the client devices 314b-314d and the third-party network server 310. For example, the analytics system 300 may track user data including, but not limited to, user actions (i.e., URL requests, link clicks, mouse hovers, text inputs, video views, button clicks, etc.), time data (i.e., when a link was clicked, how long a user stayed on a webpage, when an application was closed, etc.), path tracking data (i.e., what web pages a user visits during a given session, etc.), demographic data (i.e., an indicated age of a user, an indicated gender of a user, an indicated socioeconomic status of a user, etc.), geographic data (i.e., where a user is located, etc.), and transaction data (i.e., the types of purchases a user makes, etc.), as well as other types of data. For instance, in one embodiment, the third-party network server 310 may be a webserver, and the client device 314b may communicate with the third-party network server 310 in order to request web page information so that a certain web page may be displayed to the user 318b via the client-computing device 314b. In that case, the analytics system 300 may track the user action (i.e., requesting the web page data), the time the action was performed, the geographic information associated with the client-computing device 314b (i.e., a geographic area associated with an IP address assigned to the client-computing device 314b), and/or any demographic data that may be associated with the user 318b.

The analytics system 300 can track and store user data in various ways. For example, in some instances, the third-party network server 310 may track user data. In one embodiment, the third-party network server 310 can track the user data and then report the tracked user data to an analytical server, such as the server 304 (i.e., via the dashed line illustrated in FIG. 3). In order to obtain the tracking data described above, the third-party network server 310 may utilize data stored on the client-computing device 314b-314d (i.e., a browser cookie), embed computer code (i.e., tracking pixels), initialize a session variable, access a user profile, or engage in any other type of tracking technique. Once the third-party network server 310 has tracked the user data, the third-party network server 310 may report the tracked user data to the server 304, as will be described in more detail below with reference to FIG. 4.

The server 304 may receive tracked user data directly from the client-computing devices 314b-314d. For example, the third-party network server 310 may install software code on the client-computing devices 314b-314d that causes the client devices 314b-314d to report user data directly to the server 304. Furthermore, in some embodiments the network 312 may also track user data and report the tracked user data to the server 304. Thus, the server 304 can receive tracked user data from the third-party network server 310, the network 312, and/or the client-computing devices 314b-314d.

Also illustrated in FIG. 3, the server 304 may be communicatively coupled with an analytics database 308 (i.e. a central repository of data). In one or more embodiments, the server 304 may store tracked user data to, and query tracked user data from, the analytics database 308. In one embodiment, the analytics database 308 may be separately maintained from the server 304. Alternatively, in one embodiment, the server 304 and the analytics database 308 may be combined into a single device or collection of devices (e.g., as demonstrated by the box 302). In at least one embodiment, the analytics database 308 may be a series of remote databases controlled by a central manager.

For example, in one or more embodiments, the analytics database 308 may utilize a distributed architecture, wherein the analytics database 308 includes multiple storage devices that are not all connected to a common processing unit, but rather are controlled by a database management system. For instance, in one or more embodiments, the multiple storage devices of the analytics database 308 are dispersed over a network. Stored data may be replicated, fragmented, or partitioned across the multiple storage devices. In at least one embodiment, in response to a data query, the database management system of the analytics database 308 may return only a random sampling of data in order to save on processing time and resources. In response to a data query, the database management system of the analytics database 308 may return a full data set.

Furthermore, as shown in FIG. 3, the analytics system 300 may include a client-computing device 314a that operates an analytics application 316. In one or more embodiments, a user 318a may be a network administrator who queries analytics data from the server 304 via the client-computing device 314a. In one embodiment, the server 304 may provide various graphical user interface controls and displays to the analytics application 316 at the client-computing device 314a in order to help the user 318a perform data analysis. Additionally, the server 304 may receive and process requests from the analytics application 316, and provide analysis results based on the received requests. This process is described in greater detail below with reference to FIG. 4.

FIG. 4 illustrates a schematic diagram illustrating an example embodiment of the analytics system 300. As shown, the analytics system 300 may include, but is not limited to, the server 304 communicatively coupled to the network 312, the analytics database 308, and the client-computing device 314a. The server 304 can include the analytics manager 306, which in turn includes, but is not limited to, a data query manager 410, an anomaly detector 412, a contribution manager 414, a display generator 418, and a data storage 420. Although the disclosure herein shows the components 410-420 to be separate in FIG. 4, any of the components 410-420 may be combined into fewer components, such as into a single facility or module, or divided into more components as may serve one or more embodiments. In addition, the components 410-420 may be located on, or implemented by, one or more computing devices, such as those described below in relation to FIG. 7.

Additionally, the analytics system 300 includes the client-computing device 314a running an analytics application 316. As shown in FIG. 4, the analytics application 316 may include, but is not limited to, a display manager 402, an input detector 404, and a data storage 406. In general, the analytics system 300 can allow a user of the client-computing device 314a to utilize the server 304 and the analytics manager 306 thereon to query and analyze data. Additionally, the analytics system 300 can allow a user of the client-computing device 314a to receive analysis results from the analytics manager 306 via the analytics application 316.

The components 402-420 can comprise software, hardware, or both. For example, the components 402-420 can comprise computer instructions stored on a non-transitory computer-readable storage medium and executable by at least one processor of the client-computing device 314a. When executed by the at least one processor, the computer-executable instructions can cause the client-computing device 314a or the server 304 to perform the methods and processes described herein. Alternatively, the components 402-420 can comprise hardware, such as a special purpose processing device to perform a certain function or group of functions. Additionally, the components 402-420 can comprise a combination of computer-executable instructions and hardware.

In one or more embodiments, the analytics application 316 can be a native application installed on the client-computing device 314a. For example, the analytics application 316 may be a mobile application that installs and runs on a mobile device, such as a smart phone or a tablet. Alternatively, the analytics application 316 can be a personal computing device application, widget, or other form of a native computer program. Alternatively, the analytics application 316 may be a remote application that the client-computing device 314a accesses. For example, the analytics application 316 may be a web application that is executed within a web browser of the client-computing device 314a.

As mentioned above, and as shown in FIG. 4, the analytics application 316 can include a display manager 402. The display manager 402 can provide, manage, and/or control a graphical user interface (or simply "user interface") that allows a user to perform analysis and receiving information from the analytics manager 306. For example, the display manager 402 can provide a user interface that facilitates interactions with a display. Likewise, the display manager 402 can provide a user interface that displays analyses received from the analytics manager 306.

More specifically, the display manager 402 may facilitate the display of a user interface (e.g., by way of a display device associated with the client-computing device 314a). For example, the user interface may be composed of a plurality of graphical components, objects, and/or elements that allow a user to interact with the analytics manager 306. More particularly, the display manager 402 may direct the client-computing device 314a to display a group of graphical components, objects and/or elements as directed by the analytics manager 306, as will be described further below.

As further illustrated in FIG. 4, the analytics application 316 can include an input detector 404. In one or more embodiments, the input detector 404 can detect, receive, and/or facilitate user input in any suitable manner. In some examples, the input detector 404 can detect one or more user interactions with respect to the user interface. As referred to herein, a "user interaction" means a single interaction, or combination of interactions, received from a user by way of one or more input devices.

For example, the input detector 404 can detect a user interaction from a keyboard, mouse, touch pad, touch screen, and/or any other input device. In the event the client-computing device 314a includes a touch screen, the input detector 404 can detect one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface.

The input detector 404 receives data representative of a user interaction. For example, the input detector 404 may receive one or more user configurable parameters from a user, one or more user commands from the user, and/or any other suitable user input. The input detector 404 may receive input data from one or more components of the analytics application 316, from the storage on the client-computing device 314a, or from one or more remote locations (e.g., the analytics manager 306).

The analytics application 316 can perform one or more functions in response to the input detector 404 detecting user input and/or receiving other data. Generally, a user can control, navigate, and otherwise use the analytics application 316 by providing one or more user inputs that the input detector 404 can detect. For example, in response to the input detector 404 detecting user input, one or more components of the analytics application 316 allow the user to view data, interact with analysis controls, or submit analysis requests. In addition, in response to the input detector 404 detecting user input, one or more components of the analytics application 316 allow a user to navigate through one or more user interfaces to build or configure an analysis request.

In one or more embodiments, in response to the input detector 404 detecting one or more user inputs, the analytics application 316 can facilitate the analytics manager 306 in assisting the user in configuring an analysis request. For example, a user may provide input (e.g., via a button click, a list item selection, etc.) indicating an anomaly on which the user would like an analysis performed. In response to the input detector 404 detecting the input, the analytics manager 306 can begin analysis of the selected anomaly.

Also as mentioned above, and as illustrated in FIG. 4, the analytics application 316 may also include a data storage 406. The data storage 406 can store and maintain analytics data 408 representative of anomaly information, contributing factor information, predictive information, historical trend information, etc. In one or more embodiments, a user of the analytics application 316 can search, review, export, or share the information within the data storage 406.

As mentioned above, and as shown in FIG. 4, the server 304 can include the analytics manager 306. The analytics manager 306 can handle, process, configure, and perform all analyses required in identifying factors that contribute to metric anomalies within a network environment. Additionally, the analytics manager 306 can configure and provide a variety of displays that illustrate analysis results as well as how identified factors and sub-factor perform relative to a metric anomaly.

Also as mentioned above, the analytics manager 306 includes a data query manager 410. In one or more embodiments, the data query manager 410 can query and receive data from the analytics database 308. For example, as mentioned above, in some embodiments, in response to a data query, the analytics database 308 may return a random sample of data items that are representative of a whole data set. In that case, the analytics manager 306 can perform one or more analyses on the random data set to identify metric anomalies and contributing factors. Additionally, in at least one embodiment, the data query manager 410 can identify a whole data set that corresponds to a random sample of data items.

More particularly, in one or more embodiments the analytics database 308 comprises a plurality of distributed servers. In one or more embodiments, upon receiving a request for a contribution analysis report, the analytics manager 306 can query a small sampling of the servers. The analytics manager 306 can then process the data returned from the small sampling of servers to identify factors that appear to contribute to the anomaly. Once the a set of potential factors are identified, the analytics manager 306 can query a large amount or all of the servers in the plurality of distributed servers for the data related to the set of potential factors. In this manner the analytics manager 306 can quickly analyze and determine the contributing factors to an anomaly (i.e., in a manner of second or minutes rather than days or weeks).

In one or more embodiments the analytics manager 306 performs tens of millions of queries against the data set. Then the analytics manager 306 applies machine learning to identify which factors statistically contribute to the anomaly. More particularly, the analytics manager 106 can query eVars, props (including pathing—enter/exit), out-of-the box variables, SAINT classifications, customer attributes, social data, video data, mobile data, target based survey data, any other data that exists. The analytics manager 306 then applies the machine learning statistical test to identify across the data if is there a subset that helps explain the anomaly.

Furthermore, the data query manager 410 can maintain and utilize various data reports. In one or more embodiments, the data query manager 410 queries data from the analytics database in accordance with various data reports. For example, each data report can include queries that instruct the analytics database 308 on data items that should be returned. In at least one embodiment, the data query manager 410 can maintain and utilize hundreds, thousands, or even millions of data reports in connection with the analytics database 308. The analytics database 308 may store the data reports, and the data query manager 410 may simply instruct the analytics database 308 on which reports to run. As mentioned above, the data query manager 410 can run the maintained data reports against a random sampling of data related to a particular query rather than running the maintained data reports against all data related to the particular query in order to save time and processing power. The data query manager 410 can first run the maintained data reports against a random sampling of data related to a particular query in order to identify the most relevant data before running the maintained data reports again against the identified relevant data.

The data query manager 410 can also organize and store the results of one or more data reports. For example, as described above, the data query manager 410 and/or the analytics database 308 can process one or more data reports, which in turn return some number of data results. Accordingly, in one or more embodiments, the data query manager 410 can receive and organize the returned data results. In at least one embodiment, the data query manager 410 can organize returned data results chronologically, topically, or based on any other characteristic suitable for organizing data.

Also as illustrated in FIG. 4, the analytics manager 306 also includes the anomaly detector 412. As mentioned above, metrics within a network environment occasionally experience unexpected increases and/or decreases in frequency. As described above, some examples of metrics include, but are not limited to, web page lands, video completes, link clicks, etc.

For example, users may play a particular video on a web page an average of 10 times a day, only to one day play the video 100 times. This unexpected increase in the frequency of the "video completes" metric on that web page may or may not be an anomaly, depending on whether the increase is statistically significant. In one or more embodiments, the anomaly detector 412 can not only identify increases and decreases in the frequency of a wide range of metrics, the anomaly detector 412 can also determine if a particular increase or decrease in a metric is statistically significant, thus making the increase or decrease in a particular metric an anomaly for that metric.

The anomaly detector 412 can identify increases and decreases in a particular metric by first querying training data via the data query manager 410. For example, in order to determine whether the current metric has increased or decreased, the anomaly detector 412 can query training data related to the metric for a certain time period. In some embodiments, the training data time period can be the past 30, 60, or 90 days. The training data time period can be configurable or user selectable.

In response to an established training data time period, the anomaly detector 412 can query data associated with the metric for the training data time period via the data query manager 410. For example, if the particular metric is "video completes" and the training data time period is 30 days, the anomaly detector 412 can cause the data query manager 410 to process every existing data report associated with video completes on data that the analytics database 308 has for last 30 days. At this point, the anomaly detector 412 can perform a simple comparison to determine whether the current video completes metric has increased or decreased over the average frequency associated with the metric in question within the training data.

Next, in order to determine whether the current increase or decrease associated with a metric is statistically significant, and thus an anomaly, the anomaly detector 412 can run a predictive analysis on the training data. In one or more embodiments, the predictive analysis can involve determining an expected range associated with a metric. For example, on an average day, a web page may experience 10 video completes, but the expected range associated with the video completes metric can be plus or minus a certain amount. Thus, the anomaly detector 412 may determine that an increase or decrease in video completes by 1 or 2 video completes would not be statistically significant. In some embodiments, the anomaly detector 412 may determine that the expected range associated with a metric is within approximately 95% of the observed metric value.

Furthermore, the anomaly detector 412 can run a predictive analysis on the training data to determine an expected metric value. In one or more embodiments, the predictive analysis can determine an expected metric value by recognizing data trends associated with the metric and using machine learning to project those trends. For example, if a web page has experienced 9-11 video completes per day for the last 14 days, the predictive analysis may determine that the web page will likely continue to experience approximately 10 video completes on day 15.

The anomaly detector 412 can also determine whether an increased or decreased metric value is statistically significant, thus making the metric value anomalous. In one or more embodiments, the anomaly detector 412 can determine whether a metric value is statistically significant based on whether the metric value is outside the expected range for that particular and/or based on whether the metric value is in line with the expected metric value within the data trend, as described above. The anomaly detector 412 can further determine whether a metric value is anomalous based on other statistical analysis and/or machine learning.

As mentioned above, and as illustrated in FIG. 4, the analytics manager 306 can also include a contribution manager 414. Once the anomaly detector 412 has determined that a particular metric value is an anomaly, the contribution manager 414 can identify one or more dimension element that contributed to the anomalous metric value. As described above, in one or more embodiments, every metric (i.e., every possible user action such as page views per visit, orders per visit, hyperlink clicks, video completes, page lands, etc.) can be associated with one or more dimensions and dimension elements. For example, for a metric such as video completes, associated dimensions/dimension elements can include gender of users who watched the video, operating systems utilized by users who watched the video, search engines that referred users to the web page where they watched the video, age of users who watched the video, geographic location of users who watched the video, previous web pages visited by users who watched the video, etc. By determining which dimensions and dimension elements contributed the most to a metric anomaly, the analytics manager 306 can help a web manager understand why the anomaly occurred. Understanding why the anomaly occurred can allow a web manager to correct undesirable anomalies or reproduce positive anomalies.

Accordingly, the contribution manager 414 can identify one or more dimensions and dimension elements that contributed to an anomalous metric value by first querying all data related to the metric anomaly. In one or more embodiments, the contribution manager 414 can do this by causing the data query manager 410 to run every data report on the analytics database 308 that is associated with the anomalous metric. In at least one embodiment, the contribution manager 414 can apply machine learning to the data set returned from the analytics database 308 to determine which dimension elements statistically contributed to an identified anomaly in a single variable metric. For instance, in one embodiment, the contribution manager 414 can compare data associated with a particular factor at the time of the anomaly against training data for the same factor. Accordingly, the contribution manager 414 can detect whether a particular factor accounted for a statistical contribution to an anomaly.

If the identified anomaly is in a multi-variable metric, the contribution manager 414 can perform the calculations detailed above to identify one or more contributing dimension elements to the identified anomaly. For example, the contribution manager 414 can linearize the multi-variable metric by identifying weighted deviations for all dimension elements associated with the multi-variable metric. Put another way, the contribution manager 414 can find weights such that the total deviation in a multi-variable metric can be written as a weighted sum of deviations for the dimension element associated with the multi-variable metric, as described above.

Furthermore, the contribution manager 414 can apply other or additional statistical analysis to a particular dimension element in determining that dimension elements statistical significance. For example, in one embodiment, the contribution manager 414 can perform a "Pearson's Residual" calculation to determine a dimension element's statistical significance. Broadly, the Pearson residual calculation determines how well an observed value is predicted by a model. Accordingly, if the contribution manager 414 calculates a high Pearson's Residual for a dimension element in view of the training data associated with that dimension element, the dimension element was most likely a statistically significant contributor to the anomaly.

The contribution manager 414 can also rank, order, or organize dimension elements based on contribution scores. For example, as described above, the contribution manager 414 can utilize a statistical approach to rank weighted deviations of dimension elements associated with an anomaly in a multi-variable metric. Accordingly, the contribution manager 414 can rank the dimension elements such that the dimension elements having the greatest contribution to the metric anomaly are ranked highest.

As illustrated in FIG. 4, and as mentioned above, the analytics manager 306 can include a display generator 418. In one or more embodiments, the display generator 418 can generate displays of calculations and analyses performed by any of the data query manager 410, the anomaly detector 412, and the contribution manager 414. For example, the display generator 418 can generate trends, hierarchical trees, scatter plots, charts, or any other type of display. Furthermore, the display generator 418 can communicate generated displays to the display manager 402 of the analytics application 316 installed on the client-computing device 314a.

As mentioned above, and as illustrated in FIG. 4, the analytics manager 306 can also include a data storage 420. The data storage 420 may maintain anomaly data 422, contribution data 424, and display data 426. In one or more embodiments, the anomaly data 422 may include anomaly information identified and calculated by the analytics manager 306. Furthermore, in one or more embodiments, the contribution data 424 may include contribution information identified and analyzed by the analytics manager 306. Additionally, in one or more embodiments, the display data 426 may include display information generated by the analytics manager 306.

Figure 5:
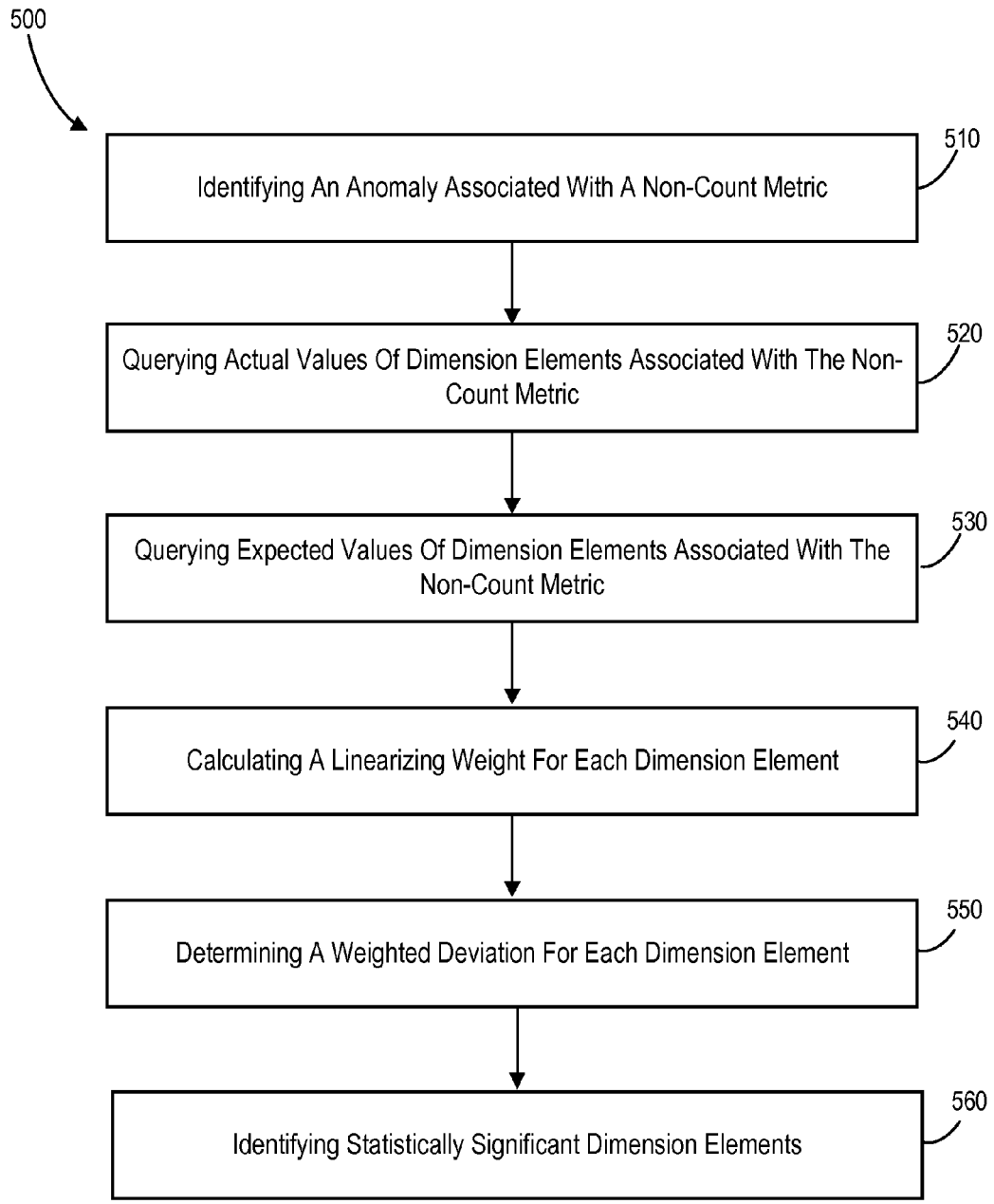
FIG. 5 illustrates a flowchart of a method of identifying contributing factors related to a multi-variable metric anomaly in accordance with one or more embodiments.

FIGS. 1-4, the corresponding text, and the examples provide a number of different methods, systems, and devices for identifying contributing factors that led to an anomaly in a multi-variable metric. In addition to the foregoing, embodiments can also be described in terms of flowcharts comprising acts and steps in a method for accomplishing a particular result. For example, FIG. 5 illustrates a flowchart illustrating acts and steps in a method of identifying contributing factors that led to an anomaly in a multi-variable metric. One will appreciate in light of the disclosure herein that the method may be performed with less or more steps/acts or the steps/acts may be performed in differing orders. Additionally, the steps/acts described herein may be repeated or performed in parallel with one another or in parallel with different instances of the same or similar steps/acts.

FIG. 5 illustrates a flowchart of one example method 500 of identifying statistically significant contributing factors associated with a multi-variable metric anomaly. The method 500 includes an act 510 of identifying an anomaly associated with a multi-variable metric. In particular, the act 510 can involve identifying a multi-variable metric that has an anomalous value or values. In one or more embodiments, identifying an anomaly includes analyzing analytics data associated with the multi-variable metric, identifying a range within the analytics data associated with the multi-variable metric that indicates how the multi-variable metric is expected to perform during a period of time, identifying a value of the multi-variable metric that exists outside the identified range.

Additionally, the method 500 includes an act 520 of querying actual values associated with the multi-variable metric. In particular, the act 520 can involve querying actual values for each of one or more dimension elements in a dimension associated with the multi-variable metric. In one or more embodiments, querying actual values for each of the one or more dimension elements in a dimension associated with the multi-variable metric includes identifying one or more dimensions associated with the multi-variable metric, for each of the one or more identified dimensions, identifying one or more dimension elements, and for each of the one or more dimension elements associated with each of the one or more dimensions, querying, from analytics data associated with the multi-variable metric, observed values over a period of time.

Furthermore, the method 500 includes an act 530 of querying expected values associated with the multi-variable metric. In particular, the act 530 can involve querying expected values for each of the one or more dimension elements in the dimension associated with the multi-variable metric. In one or more embodiments, querying expected values for each of the one or more dimension elements in the dimension associated with the multi-variable metric includes identifying one or more dimensions associated with the multi-variable metric, for each of the one or more identified dimensions, identifying one or more dimension elements, analyzing analytics data associated with each of the one or more dimension elements associated with each of the one or more dimensions, and determining, based on the analyzed analytics data, an expected value for each of the one or more dimension elements over a period of time.

The method 500 also includes an act 540 of calculating a linearizing weight for each dimension element. In particular, the act 540 can involve calculating a linearizing weight for each of the one or more dimension elements in the dimension associated with the multi-variable metric. In one or more embodiments, calculating a linearizing weight for each of the one or more dimension elements in the dimension associated with the multi-variable metric includes identifying the total calculated metric for a period of time, identifying, for each of the one or more dimension elements in the dimension associated with the multi-variable metric, a calculated metric for the period of time, and calculating, for each of the one or more dimension elements in the dimension associated with the multi-variable metric, a partial derivative of the total calculated metric for the period of time divided by a partial derivative of the calculated metric for the dimension element for the period of time. For example, in at least one embodiment, the total calculated metric for the period of time is an average metric, such that the total calculated metric equals a first total single variable metric for the period of time divided by a second total single variable metric for the period of time, and the calculated metric for a dimension element in the dimension associated with the multi-variable metric equals a first single variable metric for a particular dimension element in the dimension for the period of time divided by a second single variable metric for the particular dimension element in the dimension for the period of time. Furthermore, in at least one embodiment, the partial derivative of the total calculated metric for the period time divided by the partial derivative of the calculated metric for the particular dimension element for the period of time equals the second single variable metric for the particular dimension element in the dimension for the period of time divided by second total single variable metric for the period of time.

The method 500 further includes an act 550 of calculating a linearizing weight for each dimension element. In particular, the act 550 can involve determining a weighted deviation for each of the one or more dimension elements in the dimension, by calculating a quantity of the actual value minus the expected value, multiplied by the calculated linearizing weight. In one or more embodiments, the act 550 further includes finding a total deviation for the multi-variable metric by taking a sum of all weighted deviations.

Finally, the method 500 includes an act 560 of identifying statistically significant dimension elements. In particular, the act 560 can involve identifying, by the one or more processors, statistically significant dimension elements based on the determined weighted deviations. In one or more embodiments, identifying statistically significant dimension elements based on the determined weighted deviations includes ranking the determined weighted deviations for each of the one or more dimension elements in the dimension, and identifying one or more significantly ranked weighted deviations. In at least one embodiment, ranking the determined weighted deviations for each of the one or more dimension elements in the dimension comprises ordering the weighted deviations from most significant to least significant.

Figure 6:
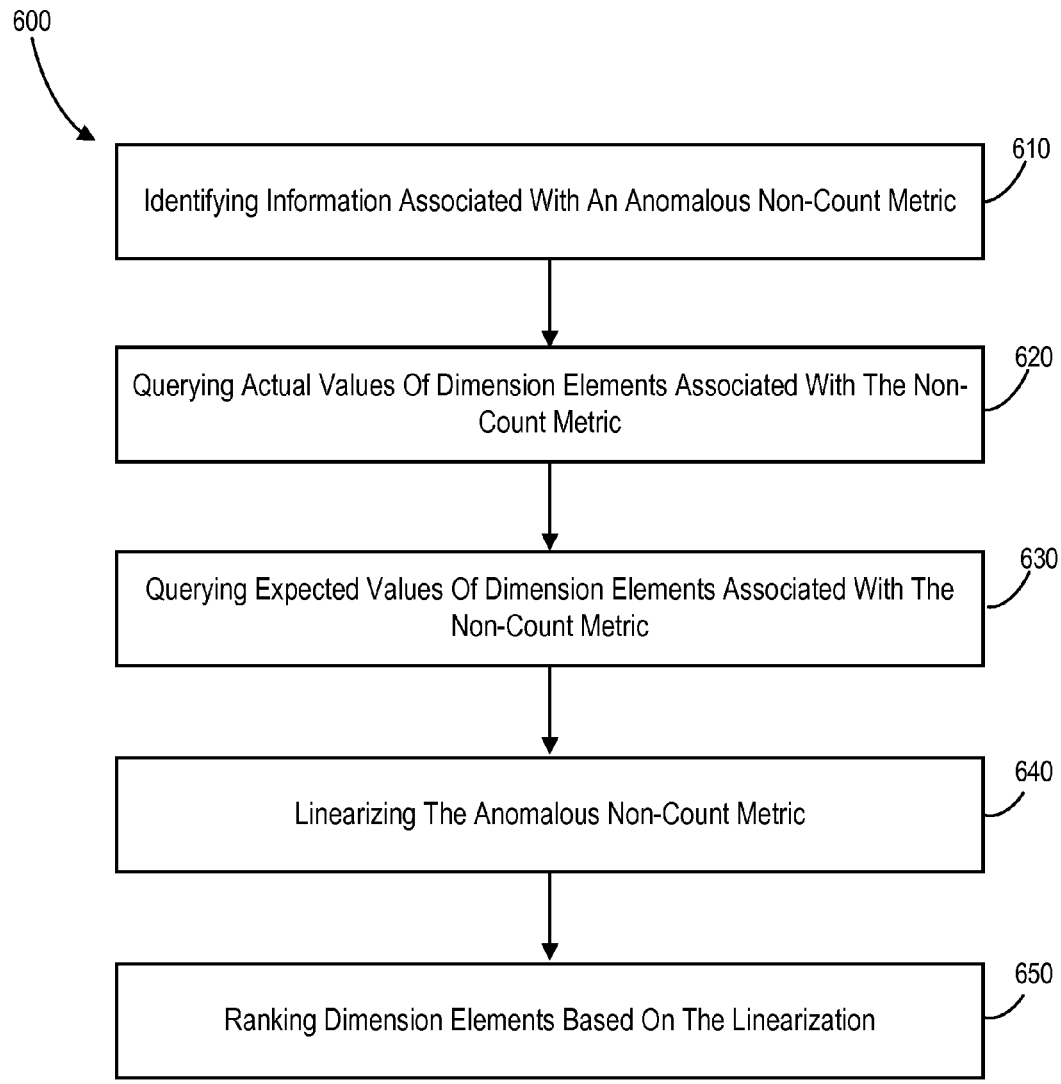
FIG. 6 illustrates another flowchart of a method of identifying contributing factors related to a multi-variable metric anomaly in accordance with one or more embodiments.

FIG. 6 illustrates a flowchart of another example method 600 of identifying statistically significant contributing factors associated with a multi-variable metric anomaly. The method 600 includes an act 610 of identifying information associated with an anomalous multi-variable metric. In particular, the act 610 can involve identifying one or more dimensions associated with associated with an anomaly of a multi-variable metric.

Additionally, the method 600 includes an act 620 of querying actual values associated with the multi-variable metric. In particular, the act 620 can involve querying actual values for one or more dimension elements of the one or more dimensions associated with the multi-variable metric. In one or more embodiments, querying actual values for the one or more dimension elements of the one or more dimensions associated with the multi-variable metric comprises, for each of the one or more dimension elements of the one or more dimensions, querying, from analytics data associated with the multi-variable metric, observed values over a period of time.

Furthermore, the method 600 includes an act 630 of querying expected values associated with the multi-variable metric. In particular, the act 630 can involve querying expected values for each of the one or more dimension elements of the one or more dimensions associated with the multi-variable metric. In one or more embodiments, querying expected values for each of the one or more dimension elements of the one or more dimensions associated with the multi-variable metric includes analyzing analytics data associated with each of the one or more dimension elements, and determining, based on the analyzed analytics data, an expected value for each of the one or more dimension elements over the period of time.

The method 600 also includes an act 640 of linearizing the multi-variable metric. In particular, the act 640 can involve linearizing the multi-variable metric based on the queried actual values and the queried expected values. In one or more embodiments, linearizing the multi-variable metric includes for each of the one or more dimension elements: calculating a linearizing weight for the actual value associated with the dimension element, calculating a linearizing weight for the expected value associated with the dimension element, and determining a weighted deviation for the dimension element by finding the difference of the actual value multiplied by the linearizing weight for the actual value and the expected value multiplied by the linearizing weight for the expected value. In at least one embodiment, the act 640 further includes identifying the total deviation associated with the multi-variable metric by adding the weighted deviations determined for each of the one or more dimension elements together.

In one or more embodiments, calculating the linearizing weight for the actual value associated with the dimension element includes, identifying a total actual calculated metric of a dimension associated with the dimension element for the period of time, identifying a calculated actual metric for the dimension element for the period of time, and calculating a partial derivative of the total actual calculated metric of the dimension associated with the dimension element for the period of time divided by a partial derivative of the calculated metric for the dimension element for the period of time. For example, calculating the linearizing weight for the expected value associated with the dimension element can include identifying a total expected calculated metric of the dimension associated with the dimension element for the period of time, identifying a calculated expected metric for the dimension element for the period of time, and calculating a partial derivative of the total expected calculated metric of the dimension associated with the dimension element for a period of time divided by a partial derivative of the calculated expected metric for the dimension element for the period of time.

Finally, the method 600 includes an act 650 of ranking dimension elements based on the linearization. In particular, the act 650 can involve ranking, by the one or more processors, the one or more dimension elements based on the linearization of the multi-variable metric. In one or more embodiments, ranking the one or more dimension elements based on the linearization of the multi-variable metric comprises ordering the one or more dimension elements based on the weighted deviation associated with each dimension element. In at least one embodiment, the act 650 also includes an act of directly comparing each of the weighted deviations by applying Pearson's Residual.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
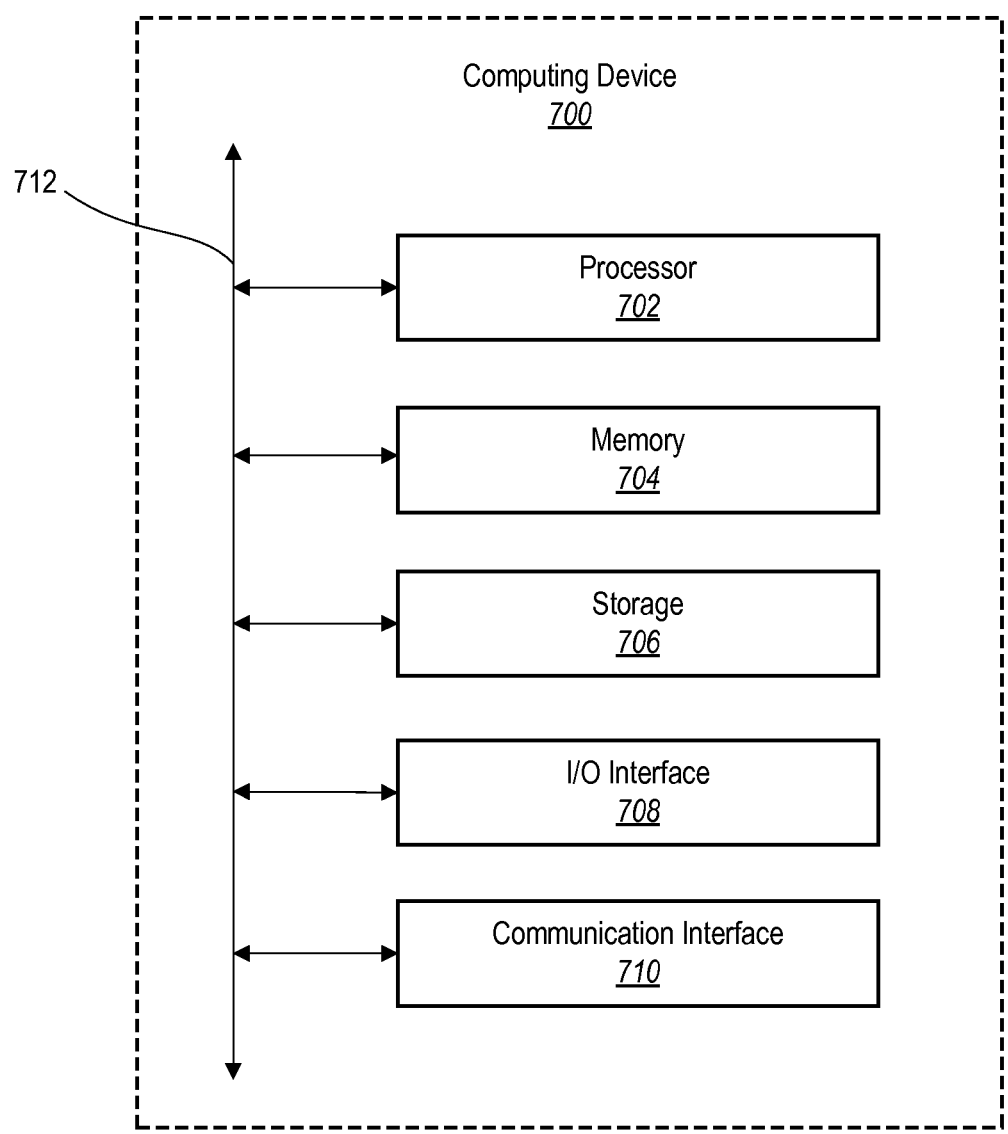
FIG. 7 illustrates a block diagram of an exemplary computing device in accordance with one or more embodiments.

FIG. 7 illustrates a block diagram of an exemplary computing device 700 that may be configured to perform one or more of the processes described above. One will appreciate that one or more computing devices, such as the computing device 700, may implement the analytics system. In particular, any of the client-computing devices 314a-314d, the third-party network server 310, the server 304, the analytics database 308, and the network 312 can comprise a computing device 700. As shown by FIG. 7, the computing device 700 can comprise a processor 702, memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In particular embodiments, the processor 702 includes hardware for executing instructions, such as those making up a computer program. As an example and not by way of limitation, to execute instructions, the processor 702 may retrieve (or fetch) the instructions from an internal register, an internal cache, the memory 704, or the storage device 706 and decode and execute them. In particular embodiments, the processor 702 may include one or more internal caches for data, instructions, or addresses. As an example and not by way of limitation, the processor 702 may include one or more instruction caches, one or more data caches, and one or more translation lookaside buffers (TLBs). Instructions in the instruction caches may be copies of instructions in the memory 704 or the storage 706.

The memory 704 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The storage device 706 includes storage for storing data or instructions. As an example and not by way of limitation, the storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. The storage device 706 may include removable or non-removable (or fixed) media, where appropriate. The storage device 706 may be internal or external to the computing device 700. In particular embodiments, the storage device 706 is non-volatile, solid-state memory. In other embodiments, the storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 708 allows a user to provide input to, receive output from, and otherwise transfer data to and receive data from the computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

The communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 8:
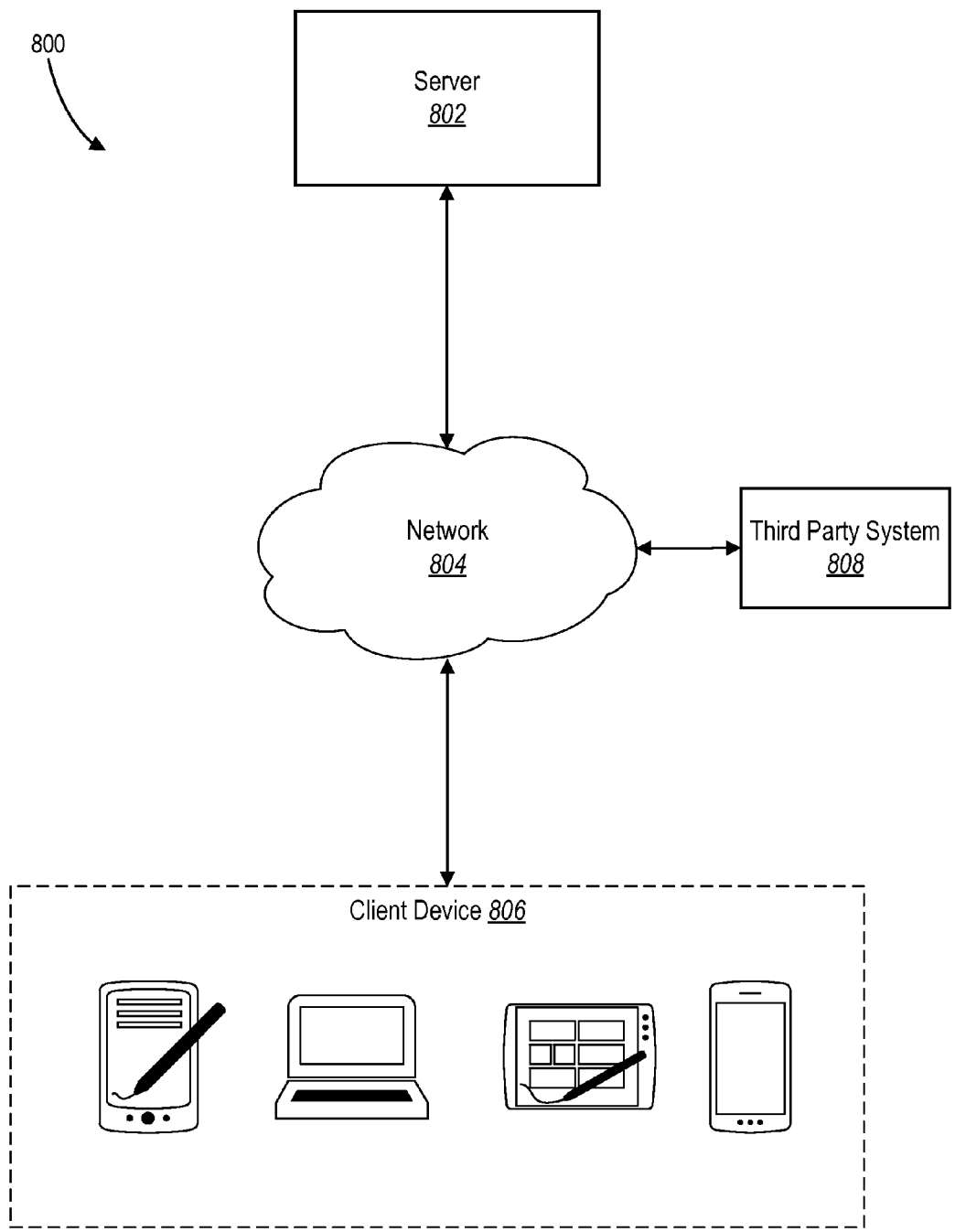
FIG. 8 is an example network environment in which an analytics manager can operate in accordance with one or more embodiments.

FIG. 8 illustrates an example network environment 800 of in which the server 304 can operate. The network environment 800 includes a client system 806, a server 802, and a third-party system 808 connected to each other by a network 804. Although FIG. 8 illustrates a particular arrangement of the client system 806, the server 802, the third-party system 808, and the network 804, this disclosure contemplates any suitable arrangement of the client system 806, the server 802, the third-party system 808, and the network 804. As an example and not by way of limitation, two or more of the client system 806, the server 802, and the third-party system 808 may be connected to each other directly, bypassing network 804. As another example, two or more of the client system 806, server 802, and third-party system 808 may be physically or logically co-located with each other in whole or in part. Moreover, although FIG. 8 illustrates a particular number of client systems 806, servers 802, third-party systems 808, and networks 804, this disclosure contemplates any suitable number of client systems 806, servers 802, third-party systems 808, and networks 804. As an example and not by way of limitation, network environment 800 may include multiple client system 806, servers 802, third-party systems 808, and networks 804.

This disclosure contemplates any suitable network 804. As an example and not by way of limitation, one or more portions of network 804 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 804 may include one or more networks 804.

Links may connect client system 806, server 802, and third-party system 808 to communication network 804 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 800. One or more first links may differ in one or more respects from one or more second links.

In particular embodiments, client system 806 may be an electronic device including hardware, software, or embedded logic components or a combination of two or more such components and capable of carrying out the appropriate functionalities implemented or supported by client system 806. As an example and not by way of limitation, a client system 806 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 806. A client system 806 may enable a network user at client system 806 to access network 804. A client system 806 may enable its user to communicate with other users at other client systems 806.

In particular embodiments, client system 806 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 806 may enter a Uniform Resource Locator (URL) or other address directing the web browser to a particular server (such as server, or a server associated with a third-party system 808), and the web browser may generate a Hyper Text Transfer Protocol (HTTP) request and communicate the HTTP request to server. The server may accept the HTTP request and communicate to client system 806 one or more Hyper Text Markup Language (HTML) files responsive to the HTTP request. Client system 806 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server 802 may be capable of linking a variety of entities. As an example and not by way of limitation, server 802 may enable users to interact with each other as well as receive content from third-party systems 808 or other entities, or to allow users to interact with these entities through an application programming interfaces (API) or other communication channels.

In particular embodiments, a third-party system 808 may include one or more types of servers, one or more data stores, one or more interfaces, including but not limited to APIs, one or more web services, one or more content sources, one or more networks, or any other suitable components, e.g., that servers may communicate with. A third-party system 808 may be operated by a different entity from an entity operating server 802. In particular embodiments, however, server 802 and third-party systems 808 may operate in conjunction with each other to provide analytics services to users of server 802 or third-party systems 808. In this sense, server 802 may provide a platform, or backbone, which other systems, such as third-party systems 808, may use to provide analytic or data/tracking services and functionality to users across the Internet.

In particular embodiments, a third-party system 808 may include a third-party content object provider. A third-party content object provider may include one or more sources of content objects, which may be communicated to a client system 806. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, server 802 may include a variety of servers, sub-systems, programs, modules, logs, and data stores. In particular embodiments, server 802 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server 802 may also include suitable components such as network interfaces, security mechanisms, load balancers, failover servers, management-and-network-operations consoles, other suitable components, or any suitable combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for digitally collecting and analyzing analytics data of a network application, a method for identifying one or more sources of an anomaly of a use or performance of the network application, comprising:

receiving, from an analytics application on a client-computing device, an indication of a multi-variable metric;

identifying, by one or more processors, an anomaly associated with the multi-variable metric comprising a function of two or more single-variable metrics;

querying actual values for each of one or more dimension elements in a dimension associated with at least one of the two or more single-variable metrics in the multi-variable metric;

querying expected values for each of the one or more dimension elements in the dimension associated with the at least one of the two or more single-variable metrics in the multi-variable metric;

calculating, by the one or more processors, a linearizing weight for each of the one or more dimension elements in the dimension associated with the at least one of the two or more single-variable metrics in the multi-variable metric by:

identifying a total calculated metric for a period of time, identifying, for each of the one or more dimension elements, a calculated metric for the period of time, and calculating, for each of the one or more dimension elements, a partial derivative of the total calculated metric for the period of time divided by a partial derivative of the calculated metric for the dimension element for the period of time;

determining, by the one or more processors, a weighted deviation for each of the one or more dimension elements in the dimension, by calculating a quantity of the actual value minus the expected value, multiplied by the calculated linearizing weight;

identifying, by the one or more processors, dimension elements based on the determined weighted deviations; and generating a single graphical user interface for display via the analytics application on the client-computing device that illustrates the dimension elements that contributed most significantly to the anomaly associated with the multi-variable metric, the single graphical user interface comprising the identified dimension elements in order based on the determined weighted deviations.

2. The method as recited in claim 1, wherein:

the total calculated metric for the period of time is an average metric, such that the total calculated metric equals a first total single-variable metric for the period of time divided by a second total single-variable metric for the period of time; and the calculated metric for a dimension element in the dimension associated with the at least one of the two or more single-variable metrics in the multi-variable metric equals a first single variable metric for a particular dimension element in the dimension for the period of time divided by a second single variable metric for the particular dimension element in the dimension for the period of time.

3. The method as recited in claim 2, wherein the partial derivative of the total calculated metric for the period of time divided by the partial derivative of the calculated metric for the particular dimension element for the period of time equals the second single-variable metric for the particular dimension element in the dimension for the period of time divided by a second total single-variable metric for the period of time.

4. The method as recited in claim 1, wherein identifying an anomaly associated with a multi-variable metric comprising a function of two or more single-variable metrics comprises:

analyzing analytics data associated with the multi-variable metric;

identifying a range within the analytics data associated with the multi-variable metric that indicates how the multi-variable metric is expected to perform during a period of time; and identifying a value of the multi-variable metric that exists outside the identified range.

5. The method as recited in claim 1, wherein querying actual values for each of the one or more dimension elements in a dimension associated with at least one of the two or more single-variable metrics in the multi-variable metric comprises:

identifying one or more dimensions associated with at least one of the two or more single-variable metrics in the multi-variable metric;

for each of the one or more identified dimensions, identifying one or more dimension elements; and for each of the one or more dimension elements associated with each of the one or more dimensions, querying, from analytics data associated with the multi-variable metric, observed values over a period of time.

6. The method as recited in claim 1, wherein querying expected values for each of the one or more dimension elements in the dimension associated with at least one of the two or more single-variable metrics in the multi-variable metric comprises:

identifying one or more dimensions associated with at least one of the two or more single-variable metrics in the multi-variable metric;

for each of the one or more identified dimensions, identifying one or more dimension elements;

analyzing analytics data associated with each of the one or more dimension elements associated with each of the one or more dimensions; and determining, based on the analyzed analytics data, an expected value for each of the one or more dimension elements over a period of time.

7. The method as recited in claim 1, wherein identifying dimension elements based on the determined weighted deviations comprises:

ranking the determined weighted deviations for each of the one or more dimension elements in the dimension; and identifying one or more significantly ranked weighted deviations.

8. The method as recited in claim 7, wherein ranking the determined weighted deviations for each of the one or more dimension elements in the dimension comprises ordering the weighted deviations from most significant to least significant.

9. The method as recited in claim 1, wherein:

identifying the anomaly associated with the multi-variable metric comprises identifying the anomaly from a random sampling of data across a plurality of distributed databases;

querying actual values for each of one or more dimension elements comprises querying actual values for each of the one or more dimension elements from the random sampling of data across the plurality of distributed databases; and querying expected values for each of the one or more dimension elements comprises querying actual values for each of the one or more dimension elements from the random sampling of data across the plurality of distributed databases.

10. The method as recited in claim 9, further comprising, in response to identifying dimension elements based on the determined weighted deviations:

querying actual values for the identified dimension elements from a complete sampling of data across the plurality of distributed databases that corresponds to the random sampling; and querying expected values for the identified dimension elements from the complete sampling of data across the plurality of distributed databases that corresponds to the random sampling.

11. The method as recited in claim 10, further comprising:

calculating a linearizing weight for each of the identified dimension elements;

determining a weighted deviation for each of the identified dimension elements by calculating a quantity of the actual value minus the expected value, multiplied by the calculated linearizing weight; and generating a display of the comprising the weighted deviation associated with each of the identified dimension elements.

12. A non-transitory computer readable medium storing instructions thereon that, when executed by at least one processor, cause a computing device to perform steps comprising:

receiving, from an analytics application on a client-computing device, an indication of a multi-variable metric;

identifying one or more dimensions associated with an anomaly of the multi-variable metric, the multi-variable metric comprising a function of two or more single-variable metrics;

querying actual values for one or more dimension elements of the one or more dimensions associated with the multi-variable metric;

querying expected values for each of the one or more dimension elements of the one or more dimensions associated with the multi-variable metric;

linearizing the multi-variable metric based on the queried actual values and the queried expected values by, for each of the one or more dimension elements, calculating a linearizing weight for the actual value associated with the dimension element, wherein calculating the linearizing weight for the actual value associated with the dimension element comprises:

identifying a total actual calculated metric of a dimension associated with the dimension element for a period of time;

identifying a calculated actual metric for the dimension element for the period of time;

calculating a partial derivative of the total actual calculated metric of the dimension associated with the dimension element for the period of time divided by a partial derivative of the calculated metric for the dimension element for the period of time; and ranking the one or more dimension elements based on the linearization of the multi-variable metric; and generating a single graphical user interface for display via the analytics application on the client-computing device that illustrates the one or more dimension elements that contributed most significantly to the anomaly associated with the multi-variable metric, the single graphical user interface comprising the one or more dimension elements in ranked order.

13. The non-transitory computer readable medium as recited in claim 12, wherein querying actual values for the one or more dimension elements of the one or more dimensions associated with the anomaly of the multi-variable metric comprises, for each of the one or more dimension elements of the one or more dimensions, querying, from analytics data associated with the multi-variable metric, observed values over a period of time.

14. The non-transitory computer readable medium as recited in claim 13, wherein querying expected values for each of the one or more dimension elements of the one or more dimensions associated with the multi-variable metric comprises:
    analyzing analytics data associated with each of the one or more dimension elements; and
    determining, based on the analyzed analytics data, an expected value for each of the one or more dimension elements over the period of time.

15. The non-transitory computer readable medium as recited in claim 14, wherein linearizing the multi-variable metric further comprises:
    for each of the one or more dimension elements:
        calculating a linearizing weight for the expected value associated with the dimension element; and
        determining a weighted deviation for the dimension element by finding a difference of the actual value multiplied by the linearizing weight for the actual value and the expected value multiplied by the linearizing weight for the expected value.

16. The non-transitory computer readable medium as recited in claim 15, further comprising instructions that, when executed by the at least one processor, cause the computing device to identify a total deviation associated with the multi-variable metric by adding the weighted deviations determined for each of the one or more dimension elements together.

17. The non-transitory computer readable medium as recited in claim 16, wherein calculating the linearizing weight for the expected value associated with the dimension element comprises:
    identifying a total expected calculated metric of the dimension associated with the dimension element for the period of time;
    identifying a calculated expected metric for the dimension element for the period of time; and
    calculating a partial derivative of the total expected calculated metric of the dimension associated with the dimension element for a period of time divided by a partial derivative of the calculated expected metric for the dimension element for the period of time.

18. The non-transitory computer readable medium as recited in claim 17, wherein ranking the one or more dimension elements based on the linearization of the multi-variable metric comprises ordering the one or more dimension elements based on the weighted deviation associated with each dimension element.

19. The non-transitory computer readable medium as recited in claim 18, further comprising instructions that, when executed by the at least one processor, cause the computing device to directly compare each of the weighted deviations by applying Pearson's Residual.

20. A system comprising:
    at least one processor; and
    at least one non-transitory computer-readable storage medium storing instructions thereon that, when executed by the at least one processor, cause the system to:
        receive, from an analytics application on a client-computing device, an indication of a multi-variable metric;
        identify an anomaly associated with the multi-variable metric comprising a function of two or more single-variable metrics;
        identify one or more dimension elements in a dimension associated with at least one of the two or more single-variable metrics in the multi-variable metric;
        calculate a linearizing weight for each of the one or more dimension elements in the dimension associated with at least one of the two or more single-variable metrics in the multi-variable metric by:
            identifying a total calculated metric for a period of time;
            identifying, for each of the one or more dimension elements in the dimension associated with at least one of the two or more single-variable metrics in the multi-variable metric, a calculated metric for the period of time; and
            calculating, for each of the one or more dimension elements in the dimension associated with at least one of the two or more single-variable metrics in the multi-variable metric, a partial derivative of the total calculated metric for the period of time divided by a partial derivative of the calculated metric for the dimension element for the period of time;
        linearize the multi-variable metric using the linearizing weight for each of the one or more dimension elements to determine a weighted deviation for each of the one or more dimension elements in the dimension;
        identify a total deviation associated with the multi-variable metric by adding the weighted deviations determined for each of the one or more dimension elements together;
        identify dimension elements that contributed to the anomaly by determining which dimension elements contributed the most to the total deviation associated with the multi-variable metric; and
        generate a single graphical user interface for display via the analytics application on the client-computing device that illustrates the dimension elements that contributed most significantly to the anomaly associated with the multi-variable metric, the single graphical user interface comprising the determined dimension elements in order based on the determined weighted deviations.

* * * * *